(12) United States Patent
Hunt

(10) Patent No.: US 10,557,253 B2
(45) Date of Patent: Feb. 11, 2020

(54) MOUNTING DEVICES AND METHODS FOR EXTERIOR FAUCETS AND LINES

(71) Applicant: David Hunt, Lula, GA (US)

(72) Inventor: David Hunt, Lula, GA (US)

( * ) Notice: Subject to any disclaimer, the term of this patent is extended or adjusted under 35 U.S.C. 154(b) by 0 days.

(21) Appl. No.: 15/946,845

(22) Filed: Apr. 6, 2018

(65) Prior Publication Data

US 2018/0291597 A1 Oct. 11, 2018

Related U.S. Application Data

(60) Provisional application No. 62/482,715, filed on Apr. 7, 2017.

(51) Int. Cl.
*E03C 1/042* (2006.01)
*F16L 5/10* (2006.01)

(52) U.S. Cl.
CPC ............... *E03C 1/042* (2013.01); *F16L 5/10* (2013.01); *E03C 2201/50* (2013.01); *Y10T 137/698* (2015.04); *Y10T 137/6977* (2015.04)

(58) Field of Classification Search
CPC ........ E03C 1/042; E03C 2201/50; F16L 5/10; Y10T 137/6977; Y10T 137/698
USPC .................................. 137/356–360; 52/60–62
See application file for complete search history.

(56) References Cited

U.S. PATENT DOCUMENTS

| | | | |
|---|---|---|---|
| 791,068 A * | 5/1905 | Baker | E04D 13/1476 285/43 |
| 3,036,814 A * | 5/1962 | Stevens | A47L 5/38 137/360 |
| 4,490,954 A * | 1/1985 | Cresti | E03C 1/042 137/377 |
| 4,553,561 A * | 11/1985 | Morris | E03F 5/12 137/357 |
| 4,635,409 A * | 1/1987 | Vandemore | E04D 13/1407 138/159 |
| 5,526,619 A | 6/1996 | Vagedes | |
| 5,918,431 A | 7/1999 | Schiedegger et al. | |
| 6,378,910 B1 | 4/2002 | Maiman | |
| 6,601,351 B1 * | 8/2003 | Zerfoss | E04D 13/1407 285/42 |
| D483,651 S | 12/2003 | Sander | |
| 6,860,070 B2 | 3/2005 | Gilleran | |
| 7,055,863 B1 | 6/2006 | Commeville et al. | |
| 7,568,314 B2 * | 8/2009 | Collins | H02G 3/22 52/219 |
| 8,881,468 B2 * | 11/2014 | McMullen | E06B 1/62 248/224.8 |

(Continued)

*Primary Examiner* — Kevin F Murphy
*Assistant Examiner* — Jonathan J Waddy
(74) *Attorney, Agent, or Firm* — Eversheds Sutherland (US) LLP

(57) ABSTRACT

Mounting devices and methods for securing an exterior faucet or lines to an exterior wall of a building are provided. In one embodiment, a mounting device for securing an exterior faucet to an exterior wall of a building may include a pair of plates, a pair of first fasteners, and a pair of second fasteners. Each of the plates may include a base, a pair of arms extending from the base and spaced apart from one another, a first hole extending through the plate, and a second hole extending through the plate. The first fasteners may be configured to pass through the respective first holes of the plates, and the second fasteners may be configured to pass through the respective second holes of the plates.

15 Claims, 20 Drawing Sheets

(56) References Cited

U.S. PATENT DOCUMENTS

| | | | |
|---|---|---|---|
| 9,140,003 B1 | 9/2015 | Gretz | |
| 2002/0062601 A1* | 5/2002 | Gilleran | E03B 7/09 52/58 |
| 2002/0108316 A1* | 8/2002 | Miller | E04D 13/1476 52/60 |
| 2007/0272341 A1* | 11/2007 | Khan | E04D 13/1407 156/71 |
| 2011/0220221 A1* | 9/2011 | Ball | E03C 1/042 137/357 |

* cited by examiner ns and structural elementsMOUNTING DEVICES AND METHODS FOR
EXTERIOR FAUCETS AND LINES

CROSS-REFERENCE TO RELATED
APPLICATIONS

This application claims the benefit of U.S. Provisional Application No. 62/482,715, filed on Apr. 7, 2017, which is incorporated by reference herein in its entirety.

FIELD OF THE DISCLOSURE

The present disclosure relates generally to hardware devices and more particularly to mounting devices and related methods for sealing and securing exterior faucets or lines with respect to an exterior wall of a building.

BACKGROUND OF THE DISCLOSURE

Various types of hardware devices are known in the art for mounting certain components or assemblies with respect to a wall of a building. Such hardware devices may include brackets, plates, hooks, clips, or other structural support members, and one or more fasteners for securing the component or assembly, directly or indirectly, to the wall. In certain applications, it may be desirable to not only secure the component or assembly with respect to the wall, but also to seal an interface between the component or assembly and the wall. Certain challenges may exist in adequately mounting components or assemblies with respect to an exterior wall of a building, particularly when the exterior wall is formed of a masonry material, such as brick, stone, or concrete.

As one example, in existing-construction applications, it may be challenging to secure an exterior faucet (e.g., hose bibs, exterior spigots, or sillcocks) with respect to an exterior wall of a building and also seal the interface between the exterior faucet and the exterior wall. During initial construction of the exterior wall, a hole or penetration typically may be formed through the exterior wall to accommodate subsequent installation of a plumbing pipe therethrough. The hole often may be significantly larger than the plumbing pipe, such that a gap exists between the pipe and the internal surfaces defining the hole in the exterior wall. As a result, upon attachment of an exterior faucet to the plumbing pipe, it may be impossible to mount the exterior faucet to the exterior wall using the conventional fasteners provided with the faucet. In particular, if the fasteners are positioned within the existing mounting apertures of the exterior faucet in a conventional manner, the fasteners may extend into the gap between the plumbing pipe and the internal surfaces defining the hole, without engaging the exterior wall. For this reason, it is quite common for an exterior faucet to be supported by only the plumbing pipe and not be mounted to the exterior wall. It will be appreciated that lack of attachment of the exterior faucet to the exterior wall may present several problems. First, due to the gap between the plumbing pipe and the internal surfaces defining the hole, the exterior faucet and the plumbing pipe may be able to wobble or otherwise move with respect to the exterior wall. Such movement may result in damage to, or loss of integrity of, the plumbing pipe, the exterior faucet, and/or the exterior wall. Second, the interface between the exterior faucet and the exterior wall may be such that the gap between the plumbing pipe and the internal surfaces defining the hole is exposed along the exterior of the building. In this manner, insects, rodents, or other pests may be able to enter the gap and cause damage or otherwise present a nuisance around the exterior faucet. Moreover, water or other environmental elements also may be able to enter the gap and cause damage therein.

In certain instances, a foam or caulk material may be applied within the gap between the plumbing pipe and the internal surfaces defining the hole in the exterior wall and/or about the interface between the exterior faucet and the exterior wall. Although this practice may provide a degree of sealing, foam and caulk materials do not adequately stabilize the plumbing pipe and the exterior faucet with respect to the exterior wall because such materials are compressible and/or deformable. Moreover, foam and caulk materials may deteriorate over time, particularly due to movement of the exterior faucet relative to the exterior wall, thus limiting their sealing function. Certain devices have been developed for mounting exterior faucets to exterior walls and providing a degree of sealing thereabout. However, such devices generally may be cumbersome to install and may accommodate only certain types and/or sizes of exterior faucets. Moreover, such devices often are limited to use in new construction and cannot be used, or cannot easily be used, in existing-construction applications. When such devices are capable of being used in existing-construction applications, installation thereof may include removing the exterior faucet from the plumbing pipe, attaching the device to the exterior wall and/or the exterior faucet, and reattaching the exterior faucet or attaching a new exterior faucet to the plumbing pipe. In this manner, the installation process may require considerable time and effort as well as turning off the water supply until the process is complete.

As another example, it may be challenging to secure certain exterior lines extending through an exterior wall of a building and also seal the interface between the lines and the exterior wall. A building may have one or more holes or penetrations formed through the exterior wall to accommodate one or more lines extending therethough. Examples of such lines may include air-conditioning (AC) lines, condensation lines, electrical conduits, and other types of lines, conduits, tubes, or pipes. The hole formed to accommodate the lines often may be irregular in shape and significantly larger than the lines, such that a gap exists between the lines and the internal surfaces defining the hole in the exterior wall. The lines often may be unsupported within the hole and able to move with respect to the exterior wall. It will be appreciated that lack of attachment of the lines to the exterior wall may present several problems. First, due to the gap between the lines and the internal surfaces defining the hole, the lines may be able to move with respect to the exterior wall. Such movement may result in damage to, or loss of integrity of, the lines. Second, the interface between the exposed portions of the lines and the exterior wall may be such that the gap between the lines and the internal surfaces defining the hole is exposed along the exterior of the building. In this manner, insects, rodents, or other pests may be able to enter the gap and cause damage or otherwise present a nuisance around the lines. Moreover, water or other environmental elements also may be able to enter the gap and cause damage therein.

In certain instances, a foam or caulk material may be applied within the gap between the lines and the internal surfaces defining the hole in the exterior wall and/or about the interface between the lines and the exterior wall. Although this practice may provide a degree of sealing, foam and caulk materials do not adequately stabilize the lines with respect to the exterior wall because such materials are compressible and/or deformable. Moreover, foam and caulk materials may deteriorate over time, particularly due to movement of the lines relative to the exterior wall, thus limiting their sealing function.

Accordingly, there remains a need for improved devices for sealing and securing exterior faucets or lines with respect to an exterior wall of a building. Such devices should adequately stabilize exterior faucets or lines relative to the exterior wall, thereby inhibiting damage due to movement of the exterior faucets or lines. Additionally, such devices should properly seal the gap between the plumbing pipes or lines and the internal surfaces defining the hole in the external wall and the interface between the exterior faucets or lines and the exterior wall, thereby inhibiting damage due to pests or environmental elements. Further, such devices should be capable of simple and quick installation in existing-construction and new-construction applications, without having to remove the exterior faucet or turn off the water supply or without having to disconnect the lines of turn off systems associated with the lines.

SUMMARY OF THE DISCLOSURE

Various embodiments described herein provide mounting devices and related methods for sealing and securing exterior faucets or lines with respect to an exterior wall of a building.

According to one aspect, a mounting device for securing an exterior faucet to an exterior wall of a building is provided. In one embodiment, the mounting device may include a pair of plates, a pair of first fasteners, and a pair of second fasteners. Each of the plates may include a base, a pair of arms extending from the base and spaced apart from one another, a slot defined between the arms, a first hole extending through the plate, and a second hole extending through the plate. The first fasteners may be configured to pass through the respective first holes of the plates, and the second fasteners may be configured to pass through the respective second holes of the plates.

In certain embodiments, each of the plates may be formed as a planar member having a U-shape defined by the base and the arms of the plate, the base may be curved, and the arms may extend substantially parallel to one another. In certain embodiments, each of the plates may be formed of sheet metal, and each of the plates may have an overall thickness that is substantially constant along the base and the arms of the plate. In certain embodiments, the slot of each of the plates may be defined by internal edges of the arms and an internal edge of the base, the internal edges of the arms may be straight, and the internal edge of the base may be curved. In certain embodiments, each of the plates may be configured to be positioned between the exterior wall and a flange of the exterior faucet, and the slot of each of the plates may be configured to receive a portion of a plumbing pipe or the exterior faucet therein.

In certain embodiments, the first hole of each of the plates may be threaded, and the second hole of each of the plates may be unthreaded. In certain embodiments, each of the first fasteners may be configured to threadably engage the respective first holes of the plates. In certain embodiments, each of the first fasteners may be a machine screw. In certain embodiments, each of the second fasteners may be a masonry screw. In certain embodiments, the mounting device may further include a pair of cover plates configured to be positioned over the respective plates. Each of the cover plates may include a base, a pair of arms extending from the base and spaced apart from one another, a slot defined between the arms, a first hole extending through the cover plate, and a second hole extending through the cover plate. Each of the cover plates may have a color and a texture pattern corresponding to a color and a texture pattern of the exterior wall.

According to another aspect, a method for securing an exterior faucet to an exterior wall of a building using a mounting device is provided. In one embodiment, the method may include step of positioning a pair plates of the mounting device between the exterior wall and a flange of the exterior faucet. Each of the plates may include a base, a pair of arms extending from the base and spaced apart from one another, a slot defined between the arms, a first hole extending through the plate, and a second hole extending through the plate. The method also may include the steps of inserting a pair of first fasteners of the mounting device through the respective first holes of the plates, and inserting a pair of second fasteners of the mounting device through the respective second holes of the plates.

In certain embodiments, the step of positioning the plates between the exterior wall and the flange of the exterior faucet may include receiving a portion of a plumbing pipe or the exterior faucet within an opening defined by the respective slots of the plates. In certain embodiments, the step of positioning the plates between the exterior wall and the flange of the exterior faucet may include positioning the plates such that the respective arms of the plates at least partially overlap one another. In certain embodiments, the step of positioning the plates between the exterior wall and the flange of the exterior faucet may include positioning the plates such that the respective first holes of the plates are aligned with a pair of mounting apertures of the flange of the exterior faucet.

In certain embodiments, the step of inserting the first fasteners through the respective first holes of the plates may include inserting the first fasteners through the respective mounting apertures of the flange of the exterior faucet. In certain embodiments, the step of inserting the first fasteners through the respective first holes of the plates may include threadably engaging the respective first holes of the plates with the first fasteners. In certain embodiments, the step of inserting the second fasteners through the respective second holes of the plates may include inserting the second fasteners into the exterior wall. In certain embodiments, the second fasteners may be inserted through the respective second holes of the plates after inserting the first fasteners through the respective first holes of the plates. In certain embodiments, the method further may include the step of positioning a pair of cover plates between the respective plates and the flange of the exterior faucet. Each of the cover plates may include a base, a pair of arms extending from the base and spaced apart from one another, a slot defined between the arms, a first hole extending through the cover plate, and a second hole extending through the cover plate. Each of the cover plates may have a color and a texture pattern corresponding to a color and a texture pattern of the exterior wall. In certain embodiments, the exterior faucet may be a hose bib, a sillcock, or a spigot.

According to still another aspect, a mounting device for securing one or more exterior lines with respect to an exterior wall of a building is provided. In one embodiment, the mounting device may include a pair of plates and a pair of fasteners. Each of the plates may include a base, a pair of arms extending from the base and spaced apart from one another, a slot defined between the arms, and a hole extending through the plate. The fasteners may be configured to pass through the respective holes of the plates.

In certain embodiments, each of the plates may be formed as a planar member having a U-shape defined by the base and the arms of the plate, the base may be curved, and the arms may extend substantially parallel to one another. In certain embodiments, each of the plates may be formed of sheet metal, and each of the plates may have an overall thickness that is substantially constant along the base and the arms of the plate. In certain embodiments, the slot of each of the plates may be defined by internal edges of the arms and an internal edge of the base, the internal edges of the arms may be curved, and the internal edge of the base may be curved. In certain embodiments, each of the plates may be configured to be positioned against the exterior wall, and the slot of each of the plates may be configured to receive a portion of the exterior lines therein.

In certain embodiments, the hole of each of the plates may be unthreaded. In certain embodiments, each of the fasteners may be a masonry screw. In certain embodiments, the plates may be identical in shape. In certain embodiments, the hole of each of the plates may be positioned along a longitudinal axis of the plate. In certain embodiments, the mounting device may further include a pair of cover plates configured to be positioned over the respective plates. Each of the cover plates may include a base, a pair of arms extending from the base and spaced apart from one another, a slot defined between the arms, and a hole extending through the cover plate. Each of the cover plates may have a color and a texture pattern corresponding to a color and a texture pattern of the exterior wall.

According to another aspect, a method for securing one or more exterior lines with respect to an exterior wall of a building using a mounting device is provided. In one embodiment, the method may include step of positioning a pair plates of the mounting device against the exterior wall. Each of the plates may include a base, a pair of arms extending from the base and spaced apart from one another, a slot defined between the arms, and a hole extending through the plate. The method also may include the step of inserting a pair of fasteners of the mounting device through the respective holes of the plates.

In certain embodiments, the step of positioning the plates against the exterior wall may include receiving a portion of the exterior lines within an opening defined by the respective slots of the plates. In certain embodiments, the step of positioning the plates against the exterior wall may include positioning the plates such that the respective arms of the plates at least partially overlap one another. In certain embodiments, the step of positioning the plates against the exterior wall may include positioning the plates such that an opening defined by the respective slots of the plates substantially corresponds to a collective cross-sectional profile of the exterior lines.

In certain embodiments, the step of inserting the fasteners through the respective holes of the plates may include inserting the fasteners into the exterior wall. In certain embodiments, the fasteners may be inserted through the respective holes of the plates after positioning the plates against the exterior wall. In certain embodiments, the method further may include the step of positioning a pair of cover plates over the respective plates. Each of the cover plates may include a base, a pair of arms extending from the base and spaced apart from one another, a slot defined between the arms, and a hole extending through the cover plate. Each of the cover plates may have a color and a texture pattern corresponding to a color and a texture pattern of the exterior wall. In certain embodiments, the one or more exterior lines may include an air conditioning line. In certain embodiments, the one or more exterior lines may include a condensation line. In certain embodiments, the one or more exterior lines may include an electrical line.

These and other aspects and embodiments of the present disclosure will be apparent or will become apparent to one of ordinary skill in the art upon review of the following detailed description when taken in conjunction with the several drawings and the appended claims.

BRIEF DESCRIPTION OF THE DRAWINGS

In describing the various embodiments of the present disclosure, reference is made to the accompanying drawings, which are not necessarily drawn to scale, and wherein.

DETAILED DESCRIPTION OF THE DISCLOSURE

Various embodiments of the present disclosure provide improved mounting devices for sealing and securing exterior faucets or lines with respect to an exterior wall of a building. In particular, the mounting devices may be used to adequately stabilize exterior faucets or lines relative to the exterior wall and also to properly seal the gap between the plumbing pipes or lines and the internal surfaces defining the hole in the external wall and the interface between the exterior faucets or lines and the exterior wall. In this manner, the mounting devices may address one or more of the above-described problems experienced with improperly attached and/or inadequately sealed exterior faucets or lines. Further, the mounting devices may facilitate simple and quick installation in existing-construction and new-construction applications, without having to remove the exterior faucet or turn off the water supply or without having to disconnect the lines of turn off systems associated with the lines.

Embodiments of the present disclosure are described herein below with reference to the accompanying drawings, in which some, but not all, embodiments are shown. Indeed, the disclosed mounting devices and methods may be embodied in many different forms and should not be construed as limited to the embodiments set forth herein; rather, these embodiments are provided so that this disclosure is thorough and complete and fully conveys the scope of the hand tools to those skilled in the art. Like reference numbers refer to like elements throughout. The singular forms "a," "an," and "the" can refer to plural instances unless the context clearly dictates otherwise or unless explicitly stated.

Figure 1A:
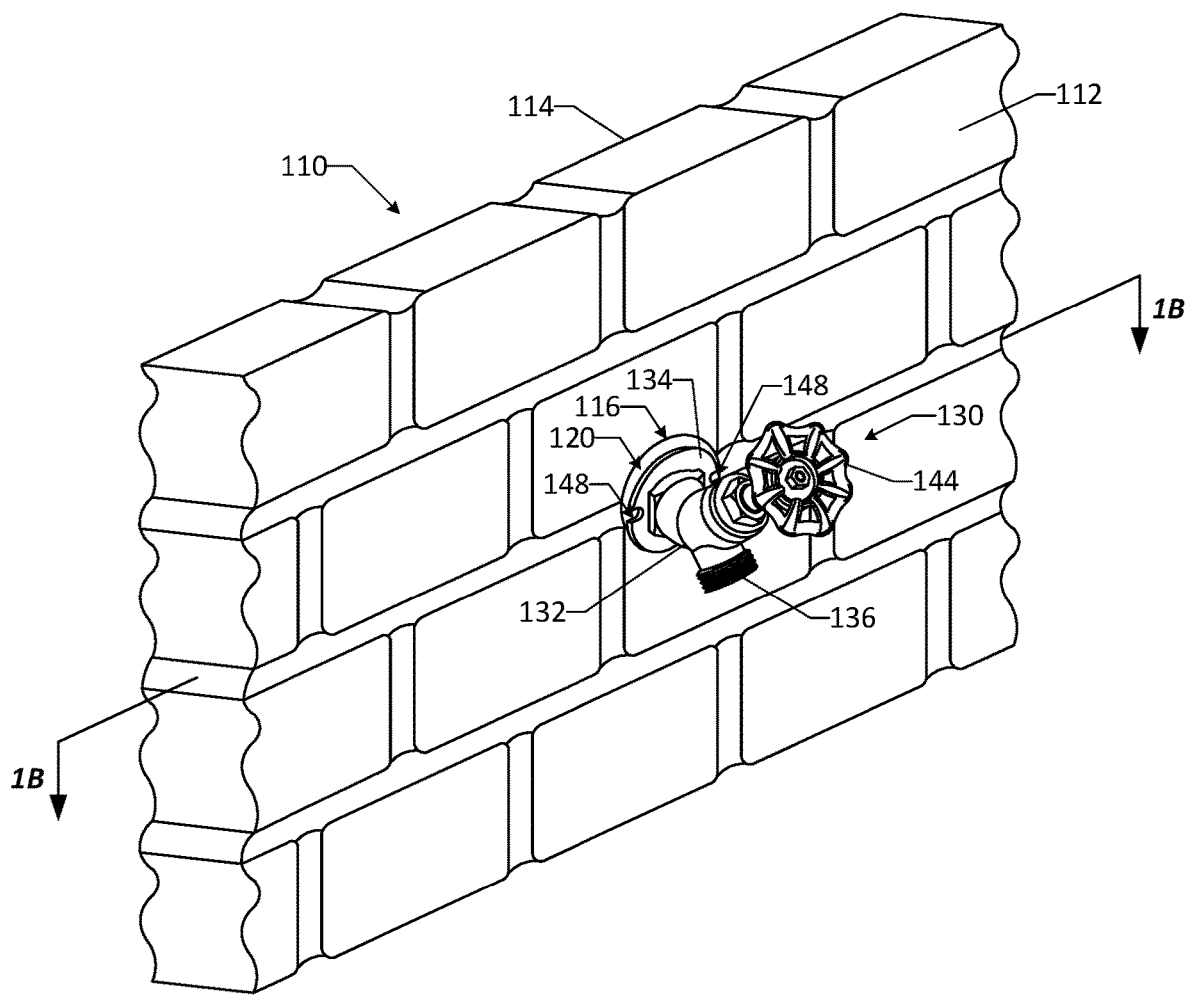
FIG. 1A is a perspective view of an exterior faucet positioned along an exterior wall of a building.
Figure 1B:
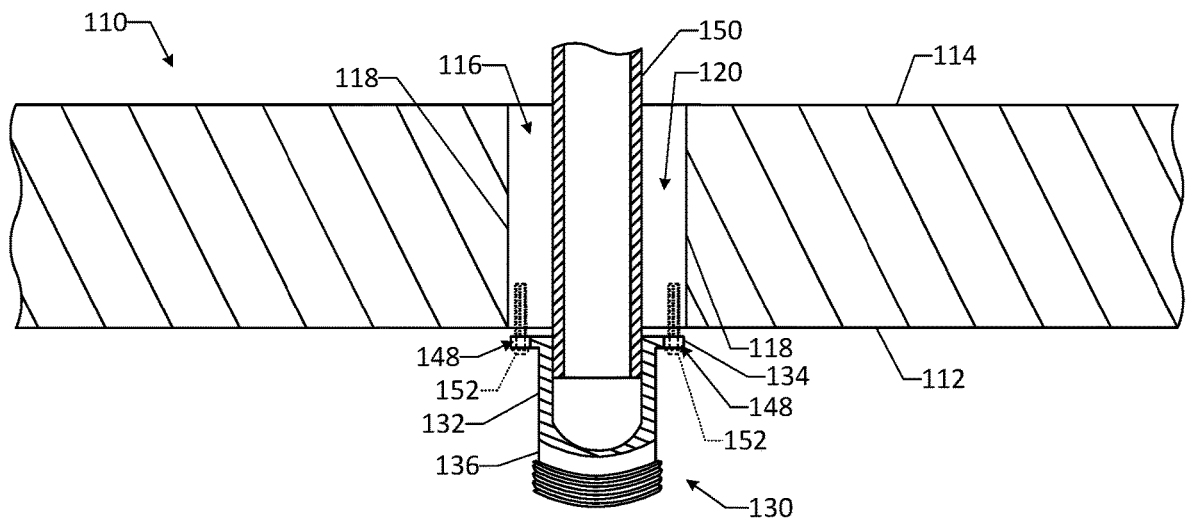
FIG. 1B is a cross-sectional top view of the exterior faucet and the exterior wall of FIG. 1A, taken along line 1B-1B.

Referring now to the drawings, FIGS. 1A and 1B illustrate an exterior wall 110 of a building and an exterior faucet 130 (which also may be referred to herein as a "hose bib") positioned along the exterior wall 110. As shown, the exterior wall 110 may be formed of a masonry material, such as brick, although other materials may be used. The exterior wall 110 may have an exterior surface 112 along an exterior side thereof and an interior surface 114 along an interior side thereof. The exterior wall 110 may be part of an existing structure, with the exterior faucet 130 already attached to a plumbing pipe 150 extending through the exterior wall 110. In particular, the plumbing pipe 150 may extend at least partially through a hole 116 (which also may be referred to herein as a "penetration") defined in the exterior wall 110. In certain embodiments, as shown, the hole 116 may extend from the exterior surface 112 to the interior surface 114 of the exterior wall 110, although other configurations of the hole 116 may be used. In this manner, the hole 116 may be defined by internal surfaces 118 of the exterior wall 110. As described above, the hole 116 may have been formed during initial construction of the exterior wall 110. As a result, the hole 116 may be significantly larger than the plumbing pipe 150, such that a gap 120 is defined between the plumbing pipe 150 and the internal surfaces 118 defining the hole 116.

Figure 1C:
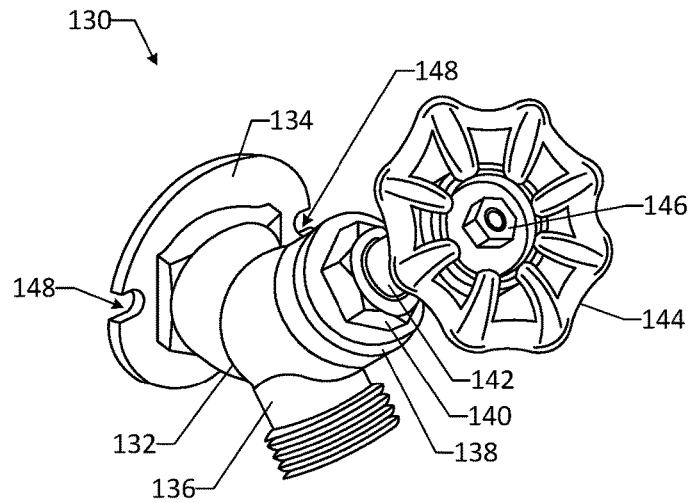
FIG. 1C is a detailed perspective view of the exterior faucet of FIG. 1A.

As shown in detail in FIG. 1C, the exterior faucet 130 may be an assembly of a number of components attached to one another and configured to control water flow therethough. Although the exterior faucet 130 is illustrated as a hose bib, other types of faucets may be used. As shown, the exterior faucet 130 may include a main body 132, a flange 134, a neck 136, a bonnet 138, a packing nut 140, a stem 142, a hand wheel 144, and a wheel nut 146. The flange 134 may be positioned at a first end of the main body 132 and extend radially outward therefrom. The flange 134 may have a generally circular shape, although other shapes of the flange 134 may be used. As shown, the flange 134 may include two or more mounting apertures 148 defined therein and configured to receive respective fasteners therethrough. In certain embodiments, as shown, the mounting apertures 148 may be formed as a pair of notches or slots defined along the outer circumference of the flange 134 on opposite sides of the main body 132. Other shapes of the mounting apertures 148 may be used, such as thru holes spaced apart from the outer circumference of the flange 134. The neck 136 may be positioned at or near an opposite second end of the main body 132 and extend downward therefrom. A free end portion of the neck 136 may be threaded, as shown, to facilitate attachment of a hose or other threaded member thereto. The bonnet 138 may be positioned at or near the second end of the main body 132 and attached thereto. The stem 142 may extend through the packing nut 140 and the bonnet 138 and into the main body 132. In this manner, the stem 142 may actuate one or more internal components to control water flow through the exterior faucet. It will be appreciated that the exterior faucet 130 may include various internal components, such as a gland packing and a seat packing, configured to control water flow through the faucet 130. The hand wheel 144 may be attached to the free end of the stem 142 by the wheel nut 146 and configured to rotate with the stem 142 to move the exterior faucet 130 between a closed configuration (i.e., preventing water flow through the faucet 130) and an open configuration (i.e., allowing water flow through the faucet 130).

FIGS. 1A and 1B illustrate an example of the scenario described above in which it is not possible to mount the exterior faucet 130 to the exterior wall 110 using conventional fasteners 152 (illustrated via dashed lines), such as screws, provided with the faucet 130 upon original manufacture. In particular, if the fasteners 152 are positioned within the mounting apertures 148 of the exterior faucet 130 in a conventional manner, the fasteners 152 may extend into the gap 120 between the plumbing pipe 150 and the internal surfaces 118 defining the hole 116, without engaging the exterior wall 110. For this reason, the fasteners 152 may not be used when the exterior faucet 130 is installed. Accordingly, the exterior faucet 130 may be supported by only the plumbing pipe 150 and not mounted to the exterior wall 110. As explained above, the lack of attachment of the exterior faucet 130 to the exterior wall 110 may present several problems, including allowing the faucet 130 and the plumbing pipe 150 to wobble or otherwise move with respect to the wall 110. In particular, the exterior faucet 130 and the plumbing pipe 150 may be able to move vertically, horizontally, and/or axially with respect to the exterior wall 110. Additionally, the lack of attachment of the exterior faucet 130 to the exterior wall 110 may allow the gap 120 to be exposed along the exterior surface 112 of the wall 110, as shown, due to the positioning of the flange 134 of the faucet 130 relative to the exterior surface 112 of the wall 110.

FIGS. 2A-2F illustrate a mounting device 200 (which also may be referred to herein as a "stabilizing device," a "sealing device," or simply a "device") according to one or more embodiments of the disclosure. As described further below, the mounting device 200 may be configured for mounting an exterior faucet to an exterior wall of a building, such that the exterior faucet is stabilized relative to the exterior wall and such that a gap between a corresponding plumbing pipe and internal surfaces of a hole in the external wall as well as an interface between the exterior faucet and the exterior wall are sealed. In this manner, the mounting device 200 may be used to address the problems associated with the exterior faucet 130 being improperly installed relative to the exterior wall 110.

Figure 2A:
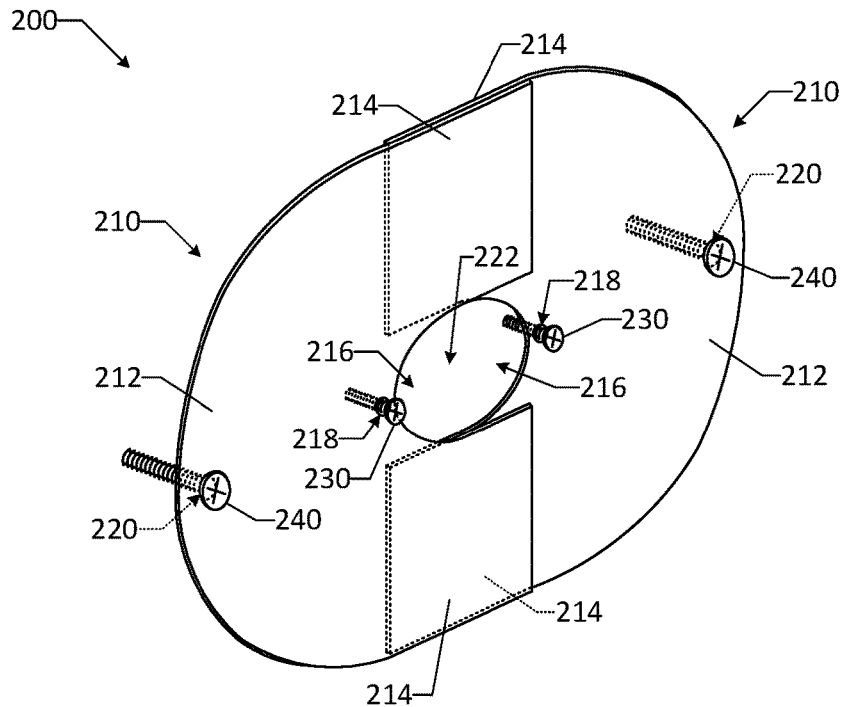
FIG. 2A is a perspective view of a mounting device in accordance with one or more embodiments of the disclosure, showing a pair of plates and a number of fasteners of the mounting device in an assembled configuration.
Figure 2B:
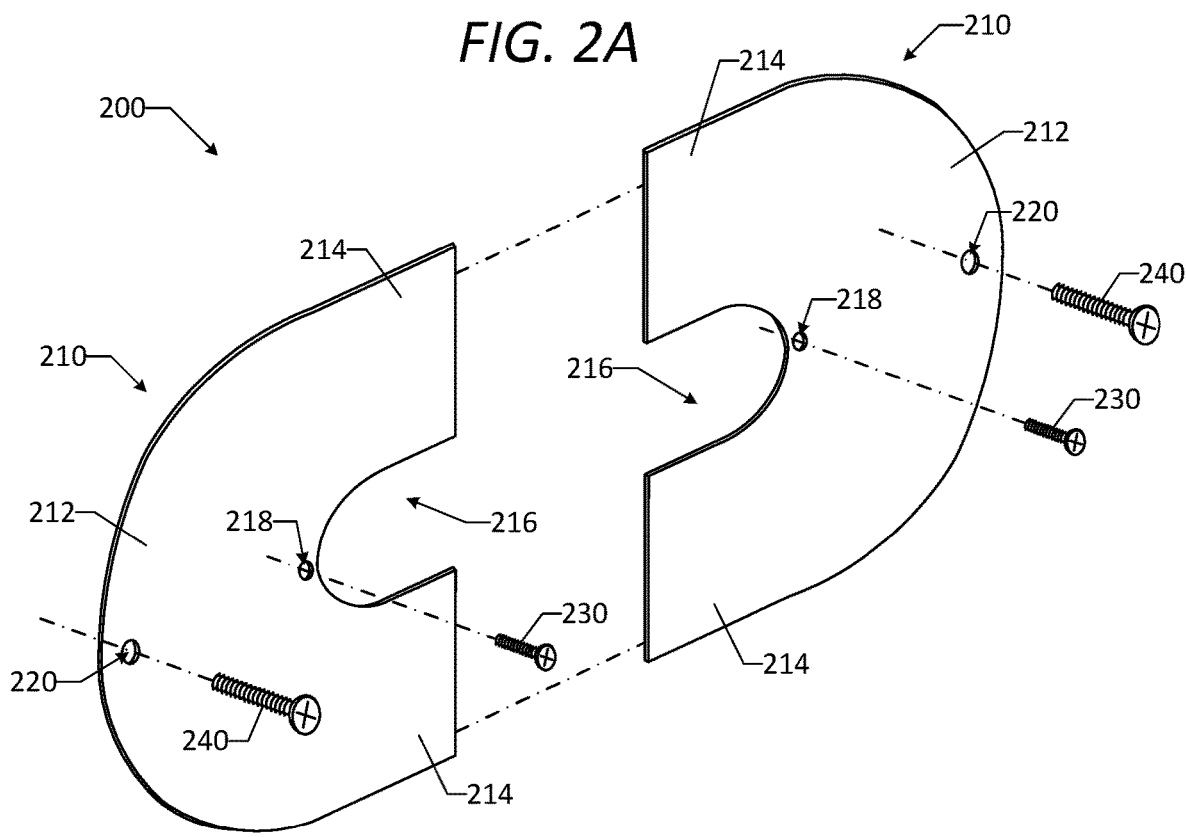
FIG. 2B is an exploded perspective view of the mounting device of FIG. 2A, showing the plates and the fasteners in a disassembled configuration.
Figure 2C:
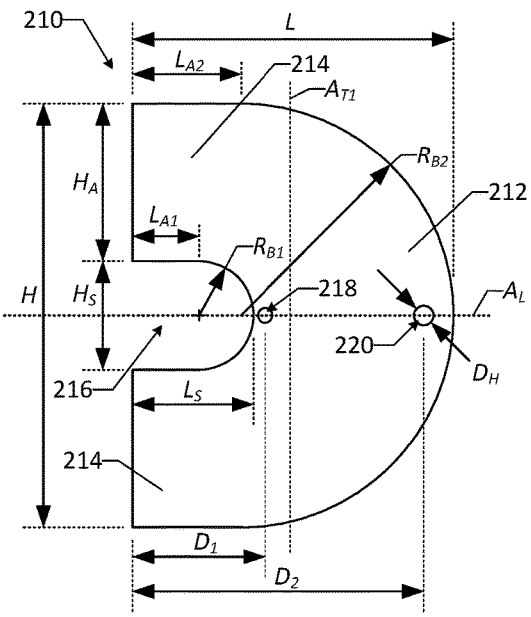
FIG. 2C is a front view of one of the plates of the mounting device of FIG. 2A.
Figure 2D:
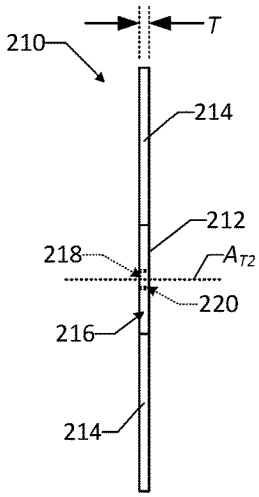
FIG. 2D is a side view of one of the plates of the mounting device of FIG. 2A.

As shown in FIGS. 2A and 2B, the mounting device 200 may include a pair of plates 210 (which also may be referred to herein as "mounting plates" of "U-plates"), a pair of first fasteners 230 (which also may be referred to herein as "faucet fasteners"), and a pair of second fasteners 240 (which also may be referred to herein as "wall fasteners"). In certain embodiments, as shown, the plates 210 may have an identical configuration. In other embodiments, one of the plates 210 may have a different configuration than the other plate 210. Each plate 210 may be formed as a flat, planar member, as shown, having an overall length L in a direction of a longitudinal axis $A_L$ of the plate 210, an overall height H in a direction of a first transverse axis $A_{T1}$ of the plate 210, and an overall thickness T in a direction of a second transverse axis $A_{T2}$ of the plate 210. In certain embodiments, the overall length L may be within a range of between 2.0 inches and 5.0 inches, the overall height H may be within a range of between 3.0 inches and 6.0 inches, and the overall thickness T may be within a range of between 0.025 inches (24 gauge) and 0.0625 inches (16 gauge). In certain embodiments, the overall length L may be 3.0 inches, the overall height H may be 4.0 inches, and the overall thickness T may be 0.0375 inches (20 gauge). In certain embodiments, the plate 210 may be formed of a sheet metal, such as steel, although other suitable materials may be used.

As shown, each plate 210 may have a U-shape, with a base 212 and a pair of arms 214 extending from the base 212 in the direction of the longitudinal axis $A_L$ of the plate 210. The base 212 may form the curved portion of the U-shape, and the arms 214 may form the straight, or substantially straight, portions of the U-shape. As shown, a slot 216 may be defined between an internal edge of the base 212 and respective internal edges of the arms 214. As described below, the slot 216 may be configured to receive a portion of a plumbing pipe and/or a portion of an exterior faucet therein during use of the mounting device 200. The base 212 may have a first radius $R_{B1}$ of curvature along the internal edge thereof and a second radius $R_{B2}$ of curvature along the external edge thereof. In certain embodiments, the first radius $R_{B1}$ may be within a range of between 0.25 inches and 1.0 inch, and the second radius $R_{B2}$ may be within a range of between 1.0 inch and 3.0 inches. In certain embodiments, the first radius $R_{B1}$ may be 0.5 inches, and the second radius $R_{B2}$ may be 2.0 inches. Each arm 214 may have a first length $L_{A1}$ along the internal edge thereof in the direction of the longitudinal axis $A_L$, a second length $L_{A2}$ along the external edge thereof in the direction of the longitudinal axis $A_L$, and a height $H_A$ along the free end edge thereof in the direction of the first transverse axis $A_{T1}$. In certain embodiments, the first length $L_{A1}$ may be within a range of between 0.25 inches and 1.5 inches, the second length $L_{A2}$ may be within a range of between 0.5 inches and 2.0 inches, and the height $H_A$ may be within a range of between 1.0 inch and 2.5 inches. In certain embodiments, the first length $L_{A1}$ may be 0.625 inches, the second length $L_{A2}$ may be 1.0 inch, and the height $H_A$ may be 1.5 inches. The slot 216 may have a length $L_S$ in the direction of the longitudinal axis $A_L$, and a height $H_S$ in the direction of the first transverse axis $A_{T1}$. In certain embodiments, the length $L_S$ may be within a range of between 0.5 inches and 2.5 inches, and the height $H_S$ may be within a range of between 0.5 inches and 2.0 inches. In certain embodiments, the length $L_S$ may be 1.125 inches, and the height $H_S$ may be 1.0 inch. As shown, the thickness T of the plate 210 may be constant along the base 212 and the arms 214 thereof. In other embodiments, the thickness T of the plate 210 may vary along the base 212 and/or the arms 214 or the thickness T of the plate 210 may different along the base 212 as compared to the arms 214.

Each plate 210 also may include a number of holes extending through the plate 210 in the direction of second transverse axis $A_{T2}$. In particular, each plate 210 may include a first hole 218 and a second hole 220 defined in the base 212 of the plate 210. As shown, the first hole 218 and the second hole 220 may be positioned along the longitudinal axis $A_L$ of the plate 210. The first hole 218 may be positioned near but spaced apart from the internal edge of the base 212, and the second hole 220 may be positioned near but spaced apart from the external edge of the base 212. A center of the first hole 218 may be spaced apart from the free end edges of the arms 214 by a first distance $D_1$ in the direction of the longitudinal axis $A_L$, and a center of the second hole 220 may be spaced apart from the free end edges of the arms 214 by a second distance $D_2$ in the direction of the longitudinal axis $A_L$. In certain embodiments, the first distance $D_1$ may be within a range of between 0.75 inches and 2.0 inches, and the second distance $D_2$ may be within a range of between 2.0 inches and 4.0 inches. In certain embodiments, the first distance $D_1$ may be 1.25 inches, and the second distance $D_2$ may be 2.75 inches. As shown, the first hole 218 may be configured to receive one of the first fasteners 230 therethrough, and the second hole 220 may be configured to receive one of the second fasteners 240 therethrough. The first fastener 230 may be a screw, and the first hole 218 may be a threaded thru hole configured to threadably engage the first fastener 230. In certain embodiments, the first fastener 230 may be a machine screw having a #8-32 male thread, and the first hole 218 may have a complimentary #8-32 female thread, although other thread sizes may be used. The second fastener 240 may be a screw, and the second hole 220 may be an unthreaded (i.e. smooth bore) thru hole configured to allow the second fastener 240 to pass therethrough. In certain embodiments, the second fastener 240 may be a masonry screw, although other types of fasteners suitable for attaching to an exterior wall may be used. In certain embodiments, the second hole 220 may have a diameter $D_H$ within a range of between 0.15 inches and 0.3 inches. In certain embodiments the diameter $D_H$ of the second hole 220 may be 0.202 inches.

Figure 2E:
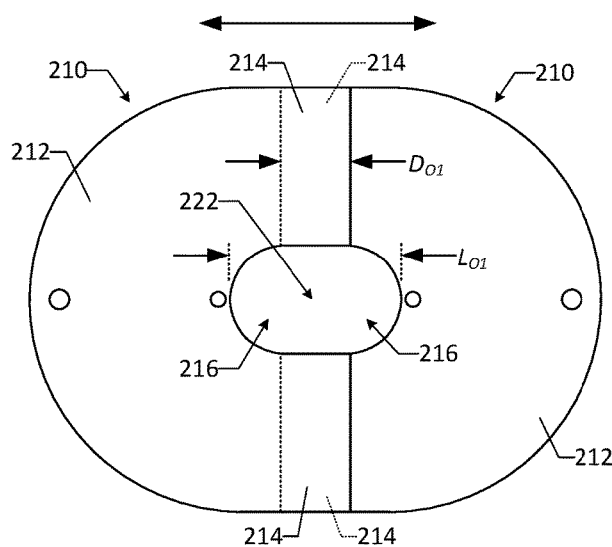
FIG. 2E is a front view of the plates of the mounting device of FIG. 2A in a first overlapping configuration.
Figure 2F:
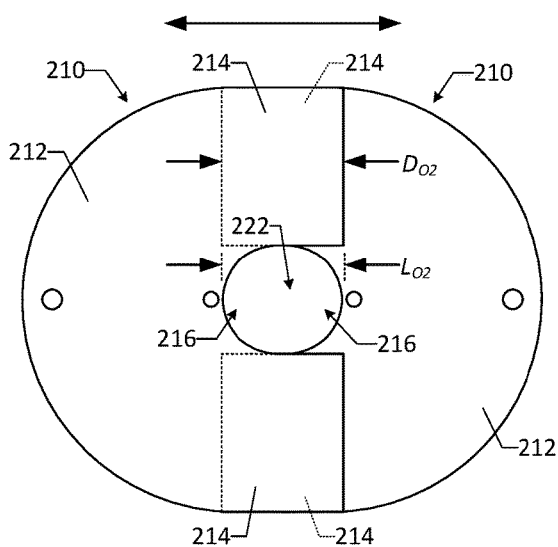
FIG. 2F is a front view of the plates of the mounting device of FIG. 2A in a second overlapping configuration.

During use of the mounting device 200, the plates 210 may be positioned to partially overlap one another, as shown in FIGS. 2E and 2F. In particular, the respective arms 214 of the plates 210 may at least partially overlap one another, while the respective internal edges and external edges of the arms 214 are generally aligned with one another. In this manner, the slots 216 of the plates 210 may collectively define an opening 222 between the internal edges of the arms 214 and/or the internal edges of the bases 212. The size of the opening 222 may be adjusted by the degree of overlap of the respective arms 214 of the plates 210. For example, in a first configuration shown in FIG. 2E, the plates 210 may be positioned with a first overlap distance $D_{O1}$ of the arms 214 in the direction of the longitudinal axes $A_L$ of the plates 210, such that the opening 222 has a discorectangle (i.e., stadium) shape and a first length $L_{O1}$. The plates 210 may be translated relative to one another from the first configuration to a second configuration shown in FIG. 2F, in which the plates 210 may be positioned with a second overlap distance $D_{O2}$ of the arms 214 in the direction of the longitudinal axes $A_L$ of the plates 210, such that the opening 222 has a circular shape and a second length $L_{O2}$ (i.e., diameter). It will be appreciated that the plates 210 may be positioned in various configurations with different overlap distances to adjust the size of the opening 222, as desired, to accommodate a portion of a plumbing pipe and/or exterior faucet of different sizes and shapes.

Figure 2G:
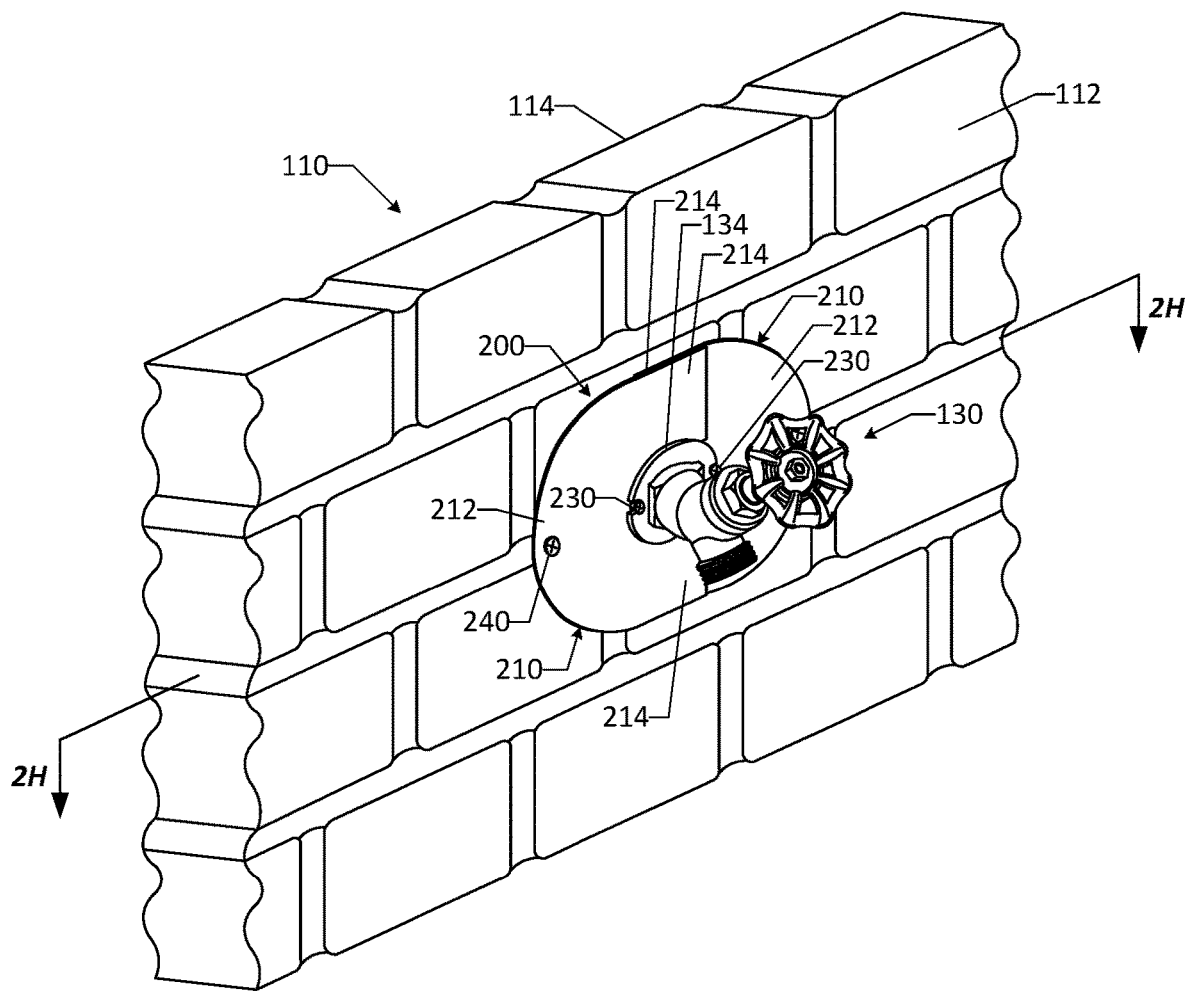
FIG. 2G is a perspective view of an exterior faucet mounted to an exterior wall of a building via the mounting device of FIG. 2A.
Figure 2H:
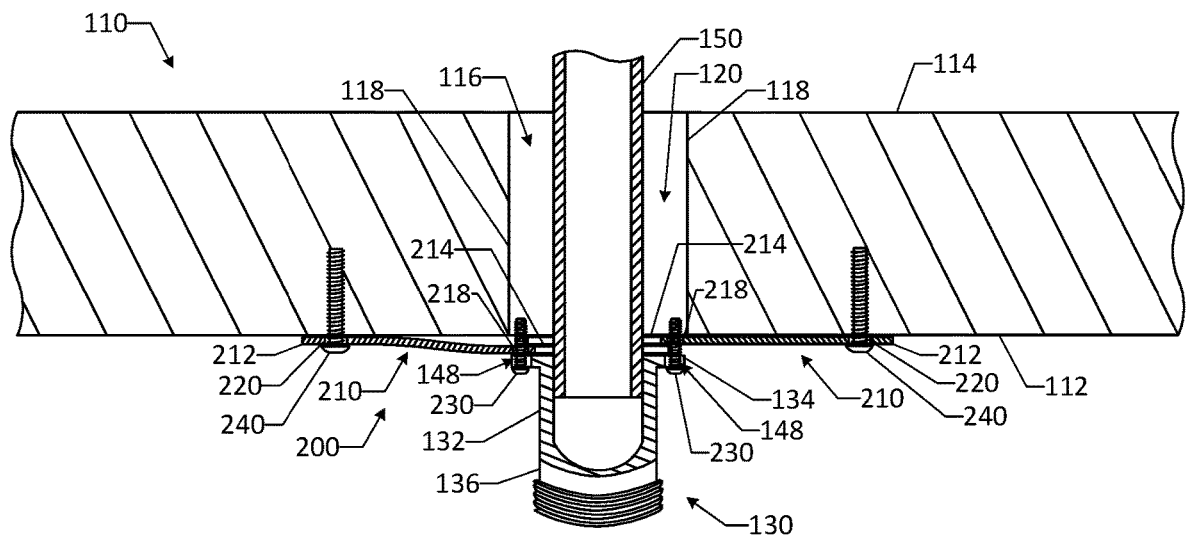
FIG. 2H is a cross-sectional top view of the exterior faucet, the exterior wall, and the mounting device of FIG. 2G, taken along line 2H-2H.

FIGS. 2G and 2H illustrate the mounting device 200 being used to mount the exterior faucet 130 to the exterior wall 110, according to one or more embodiments of the disclosure. The mounting device 200 may be installed by initially positioning one of the plates 210 (which may be referred to herein as a "first plate") between the exterior wall 110 and the flange 134 of the exterior faucet 130, such that the plumbing pipe 150 is at least partially received within the slot 216 of the first plate 210. In particular, the first plate 210 may be slid into position, from either the right side or the left side of the exterior faucet 130, until the plumbing pipe 150 is received within the slot 216, while the longitudinal axis $A_L$ of the first plate 210 is maintained in a horizontal or substantially horizontal orientation, as shown. In a similar manner, the other plate 210 (which may be referred to herein as a "second plate") then may be positioned between the exterior wall 110 and the flange 134 of the exterior faucet 130, such that the plumbing pipe 150 is at least partially received within the slot 216 of the second plate 210. In particular, the second plate 210 may be slid into position, from either the right side or the left side of the exterior faucet 130 (i.e., the side opposite that from which the first plate 210 was inserted), until the plumbing pipe 150 is received within the slot 216, while the longitudinal axis $A_L$ of the second plate 210 is maintained in a horizontal or substantially horizontal orientation, as shown. With the plates 210 positioned in this manner, the first plate 210 and the second plate 210 may at least partially overlap one another. In particular, the respective arms 214 of the plates 210 may at least partially overlap one another, as shown. In certain embodiments, the respective arms 214 of each plate 210 also may partially overlap a portion of the base 212 of the other plate 210. The degree of overlap of the plates 210 may be adjusted (i.e., the plates 210 may be translated with respect to one another in the direction of the longitudinal axes $A_L$ thereof) until the respective first holes 218 of the plates 210 are aligned with the mounting apertures 148 of the flange 134 of the exterior faucet 130.

With the respective first holes 218 of the plates 210 aligned with the mounting apertures 148 of the flange 134, the first fasteners 230 then may be inserted through the mounting apertures 148 and into the first holes 218. In particular, one of the first fasteners 230 may be inserted through one of the mounting apertures 148 and into the first hole 218 of the first plate 210, and the other of the first fasteners 230 may be inserted through the other of the mounting apertures 148 and into the first hole 218 of the second plate 210. As described above, the first holes 218 may be threaded such that the first fasteners 230 threadably engage the respective first holes 218. Alternatively, the first fasteners 230 may be inserted into the respective first holes 218 of the plates 210 prior to positioning of the plates 210 with respect to the exterior faucet 130 as described above, with the heads of the first fasteners 230 spaced apart from the respective plates 210. In this manner, the first fasteners 230 may be slid into the respective mounting apertures 148 as the plates 210 are slid between the exterior wall 110 and the flange 134. Either way, once the first fasteners 230 are positioned within the respective first holes 218 and within the respective mounting holes 148, the first fasteners 230 may be tightened by threadably advancing the first fasteners 230 through the plates 210 until the heads of the first fasteners 230 engage the flange 134 adjacent the respective mounting apertures 148. In this manner, the plates 210 of the mounting device 200 may be securely attached to the exterior faucet 130.

After attaching the plates 210 to the flange 134 of the exterior faucet 130, the plates 210 may be attached to the exterior wall 110 by inserting the second fasteners 240 through the respective second holes 220. In particular, one of the second fasteners 240 may be inserted through the second hole 220 of the first plate 210 and into the exterior wall 110, and the other of the second fasteners 240 may be inserted through the second hole 220 of the second plate 210 and into the exterior wall 110. As described above, the second fasteners 240 may be masonry screws, although other types of suitable fasteners may be used. In certain embodiments, respective holes may be drilled or tapped in the exterior wall 110 through the second holes 220 of the plates 210 prior to inserting the second fasteners 240 into the exterior wall 110. In other embodiments, the second fasteners 240 may be self-tapping, such that prior drilling in the exterior wall 110 is not required. Either way, once the second fasteners 240 are inserted through the respective second holes 220 and into the exterior wall 110, the second fasteners 240 may be tightened by advancing the second fasteners 240 through the plates 210 until the heads of the second fasteners 240 engage the plates 210 adjacent the respective second holes 220. In this manner, the plates 210 of the mounting device 200 may be securely attached to the exterior wall 110. In certain embodiments, as the second fasteners 240 are tightened, a portion of one or both of the plates 210 may deform slightly to conform to the shape or contour of mating portions of the exterior wall 110, the other plate 210, and/or the exterior faucet 130. For example, a portion of the outer plate 210 (i.e., the plate 210 having its arms 214 positioned adjacent the flange 134 of the exterior faucet 130) may deform slightly, as shown, to conform to the shape of the exterior wall 110 and the inner plate 210 (i.e., the plate 210 having its arms 214 positioned adjacent the exterior wall 110). In this manner, the deformation of the plates 210 may facilitate sealing of the gap 120 and the interface between the exterior wall 110 and the exterior faucet 130, as the plates 210 conform to the exterior wall 110 and accommodate irregularities in the exterior surface 112 thereof.

With the mounting device 200 installed in the above-described manner, the exterior faucet 130 may be securely mounted to the exterior wall 110 via the plates 210, the first fasteners 230, and the second fasteners 240. Moreover, the mounting device 200 may adequately seal the gap 120 between the plumbing pipe 150 and the internal surfaces 118 of the exterior wall 110 as well as the interface between the exterior faucet 130 and the exterior wall 110. In this manner, the mounting device 200 may be used to address the problems associated with the exterior faucet 130 being improperly installed with respect to the exterior wall 110. It will be appreciated that the adjustable nature of the mounting device 200 may accommodate plumbing pipes 150 and exterior faucets 130 of different sizes and shapes. In this manner, the mounting device 200 may be easily used in existing-construction applications, although the device similarly may be used in new-construction applications. The configuration of the mounting device 200 allows it to be installed in a quick and efficient manner, with minimal tools required, and without requiring removal of the exterior faucet 130 from the plumbing pipe 150 or turning off the water supply to the faucet 130. Further, the mounting device 200 may be easily removed, if desired, for example to access or inspect the plumbing pipe 150.

Figure 2I:
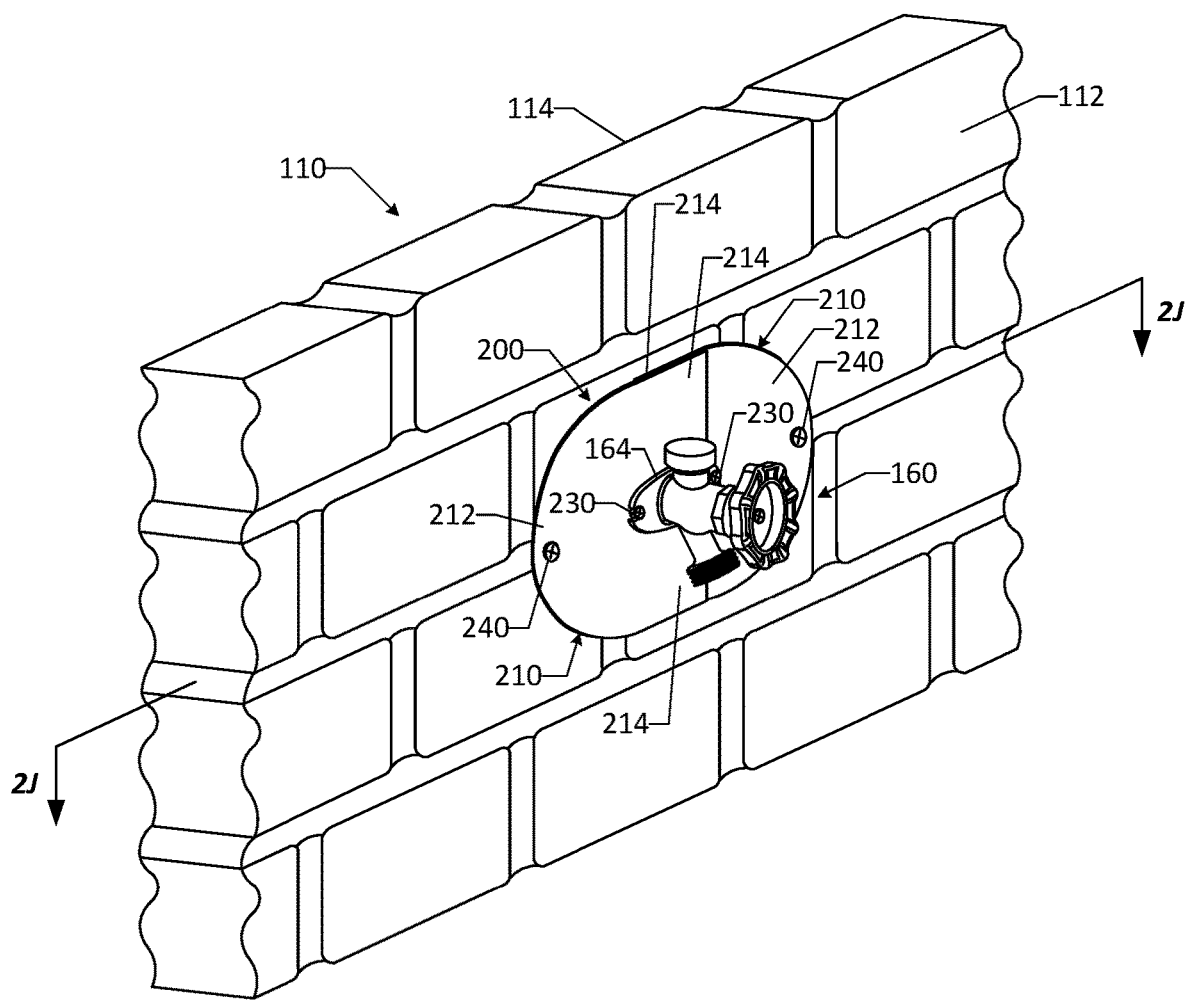
FIG. 2I is a perspective view of an exterior faucet mounted to an exterior wall of a building via the mounting device of FIG. 2A.
Figure 2J:
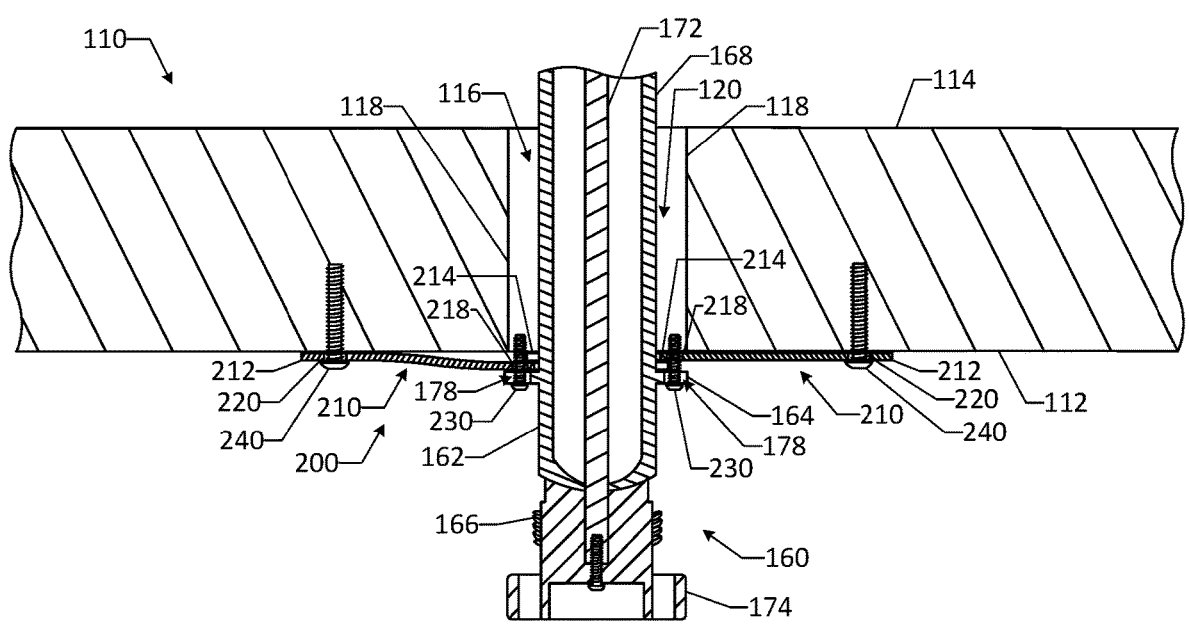
FIG. 2J is a cross-sectional top view of the exterior faucet, the exterior wall, and the mounting device of FIG. 2I, taken along line 2J-2J.
Figure 2K:
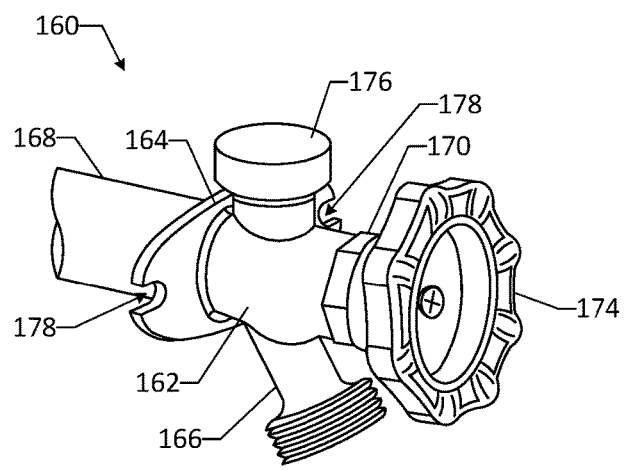
FIG. 2K is a detailed perspective view of the exterior faucet of FIG. 2I.

FIGS. 2I and 2J illustrate the mounting device 200 being used to mount another type of exterior faucet 160 (which also may be referred to herein as a "sillcock" or a "frost free sillcock") to the exterior wall 110, according to one or more embodiments of the disclosure. As shown in detail in FIG. 2K, the exterior faucet 160 may be an assembly of a number of components attached to one another and configured to control water flow therethough. Although the exterior faucet 160 is illustrated as a sillcock, in particular a frost free sillcock, other types of faucets may be used. As shown, the exterior faucet 160 may include a main body 162, a flange 164, a neck 166, a pipe 168, a packing nut 170, a stem 172, a hand wheel 174, and a vacuum breaker assembly 176. The flange 164 may be positioned at a first end of the main body 162 and extend radially outward therefrom. The flange 164 may have an oblong, generally oval shape, although other shapes of the flange 164 may be used. As shown, the flange 164 may include two or more mounting apertures 178 defined therein and configured to receive respective fasteners therethrough. In certain embodiments, as shown, the mounting apertures 178 may be formed as a pair of notches or slots defined along the outer circumference of the flange 164 on opposite sides of the main body 162. Other shapes of the mounting apertures 178 may be used, such as thru holes spaced apart from the outer circumference of the flange 164. The neck 166 may be positioned at or near an opposite second end of the main body 162 and extend downward therefrom. A free end portion of the neck 166 may be threaded, as shown, to facilitate attachment of a hose or other threaded member thereto. The pipe 168 may extend from the first end of the main body 132 and be attached thereto. The pipe 168 may extend through the hole 116 in the exterior wall 110 and be attached to a plumbing pipe along the interior side of the wall 110. In this manner, the gap 120 may be defined between the pipe 168 of the exterior faucet 160 and the internal surfaces 118 of the hole 116. The stem 172 may extend through the packing nut 170 and the main body 162 and into the pipe 168. In this manner, the stem 172 may actuate one or more internal components to control water flow through the exterior faucet 160. It will be appreciated that the exterior faucet 160 may include various internal components, such as a bib washer and a faucet seat, configured to control water flow through the faucet 160. The hand wheel 174 may be attached to the stem 172 by a fastener, such as a screw, and configured to rotate with the stem 172 to move the exterior faucet 160 between a closed configuration (i.e., preventing water flow through the faucet 160) and an open configuration (i.e., allowing water flow through the faucet 160).

Returning to FIGS. 2I and 2J, the mounting device 200 may be installed by initially positioning one of the plates 210 (which may be referred to herein as a "first plate") between the exterior wall 110 and the flange 164 of the exterior faucet 160, such that the pipe 168 is at least partially received within the slot 216 of the first plate 210. In particular, the first plate 210 may be slid into position, from either the right side or the left side of the exterior faucet 160, until the pipe 168 is received within the slot 216, while the longitudinal axis $A_L$ of the first plate 210 is maintained in a horizontal or substantially horizontal orientation, as shown. In a similar manner, the other plate 210 (which may be referred to herein as a "second plate") then may be positioned between the exterior wall 110 and the flange 164 of the exterior faucet 160, such that the pipe 168 is at least partially received within the slot 216 of the second plate 210. In particular, the second plate 210 may be slid into position, from either the right side or the left side of the exterior faucet 160 (i.e., the side opposite that from which the first plate 210 was inserted), until the pipe 168 is received within the slot 216, while the longitudinal axis $A_L$ of the second plate 210 is maintained in a horizontal or substantially horizontal orientation, as shown. With the plates 210 positioned in this manner, the first plate 210 and the second plate 210 may at least partially overlap one another. In particular, the respective arms 214 of the plates 210 may at least partially overlap one another, as shown. In certain embodiments, the respective arms 214 of each plate 210 also may partially overlap a portion of the base 212 of the other plate 210. The degree of overlap of the plates 210 may be adjusted (i.e., the plates 210 may be translated with respect to one another in the direction of the longitudinal axes $A_L$ thereof) until the respective first holes 218 of the plates 210 are aligned with the mounting apertures 178 of the flange 164 of the exterior faucet 160.

With the respective first holes 218 of the plates 210 aligned with the mounting apertures 178 of the flange 164, the first fasteners 230 then may be inserted through the mounting apertures 178 and into the first holes 218. In particular, one of the first fasteners 230 may be inserted through one of the mounting apertures 178 and into the first hole 218 of the first plate 210, and the other of the first fasteners 230 may be inserted through the other of the mounting apertures 178 and into the first hole 218 of the second plate 210. As described above, the first holes 218 may be threaded such that the first fasteners 230 threadably engage the respective first holes 218. Alternatively, the first fasteners 230 may be inserted into the respective first holes 218 of the plates 210 prior to positioning of the plates 210 with respect to the exterior faucet 160 as described above, with the heads of the first fasteners 230 spaced apart from the respective plates 210. In this manner, the first fasteners 230 may be slid into the respective mounting apertures 178 as the plates 210 are slid between the exterior wall 110 and the flange 164. Either way, once the first fasteners 230 are positioned within the respective first holes 218 and within the respective mounting holes 178, the first fasteners 230 may be tightened by threadably advancing the first fasteners 230 through the plates 210 until the heads of the first fasteners 230 engage the flange 164 adjacent the respective mounting apertures 148. In this manner, the plates 210 of the mounting device 200 may be securely attached to the exterior faucet 160.

After attaching the plates 210 to the flange 164 of the exterior faucet 160, the plates 210 may be attached to the exterior wall 110 by inserting the second fasteners 240 through the respective second holes 220. In particular, one of the second fasteners 240 may be inserted through the second hole 220 of the first plate 210 and into the exterior wall 110, and the other of the second fasteners 240 may be inserted through the second hole 220 of the second plate 210 and into the exterior wall 110. As described above, the second fasteners 240 may be masonry screws, although other types of suitable fasteners may be used. In certain embodiments, respective holes may be drilled or tapped in the exterior wall 110 through the second holes 220 of the plates 210 prior to inserting the second fasteners 240 into the exterior wall 110. In other embodiments, the second fasteners 240 may be self-tapping, such that prior drilling in the exterior wall 110 is not required. Either way, once the second fasteners 240 are inserted through the respective second holes 220 and into the exterior wall 110, the second fasteners 240 may be tightened by advancing the second fasteners 240 through the plates 210 until the heads of the second fasteners 240 engage the plates 210 adjacent the respective second holes 220. In this manner, the plates 210 of the mounting device 200 may be securely attached to the exterior wall 110. In certain embodiments, as the second fasteners 240 are tightened, a portion of one or both of the plates 210 may deform slightly to conform to the shape or contour of mating portions of the exterior wall 110, the other plate 210, and/or the exterior faucet 160. For example, a portion of the outer plate 210 (i.e., the plate 210 having its arms 214 positioned adjacent the flange 164 of the exterior faucet 160) may deform slightly, as shown, to conform to the shape of the exterior wall 110 and the inner plate 210 (i.e., the plate 210 having its arms 214 positioned adjacent the exterior wall 110). In this manner, the deformation of the plates 210 may facilitate sealing of the gap 120 and the interface between the exterior wall 110 and the exterior faucet 160, as the plates 210 conform to the exterior wall 110 and accommodate irregularities in the exterior surface 112 thereof.

With the mounting device 200 installed in the above-described manner, the exterior faucet 160 may be securely mounted to the exterior wall 110 via the plates 210, the first fasteners 230, and the second fasteners 240. Moreover, the mounting device 200 may adequately seal the gap 120 between the pipe 168 of the exterior faucet 160 and the internal surfaces 118 of the exterior wall 110 as well as the interface between the faucet 160 and the exterior wall 110. In this manner, the mounting device 200 may be used to address the problems associated with the exterior faucet 160 being improperly installed with respect to the exterior wall 110. It will be appreciated that the adjustable nature of the mounting device 200 may accommodate pipes 168 and exterior faucets 160 of different sizes and shapes. In this manner, the mounting device 200 may be easily used in existing-construction applications, although the device similarly may be used in new-construction applications. The configuration of the mounting device 200 allows it to be installed in a quick and efficient manner, with minimal tools required, and without requiring removal of the exterior faucet 160 from the plumbing pipe or turning off the water supply to the faucet 160. Further, the mounting device 200 may be easily removed, if desired, for example to access or inspect the plumbing pipe.

Figure 2L:
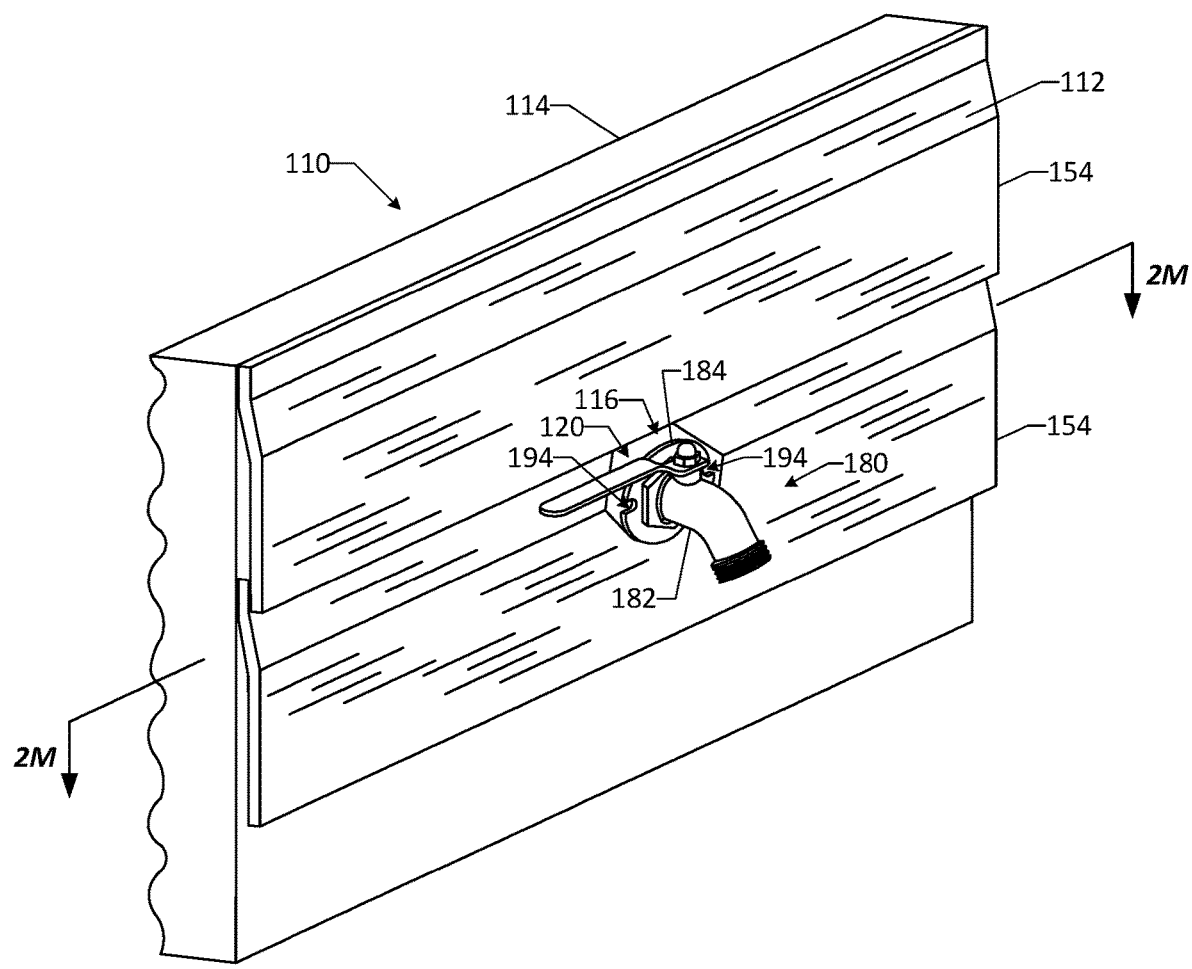
FIG. 2L is a perspective view of an exterior faucet positioned along an exterior wall of a building.
Figure 2M:
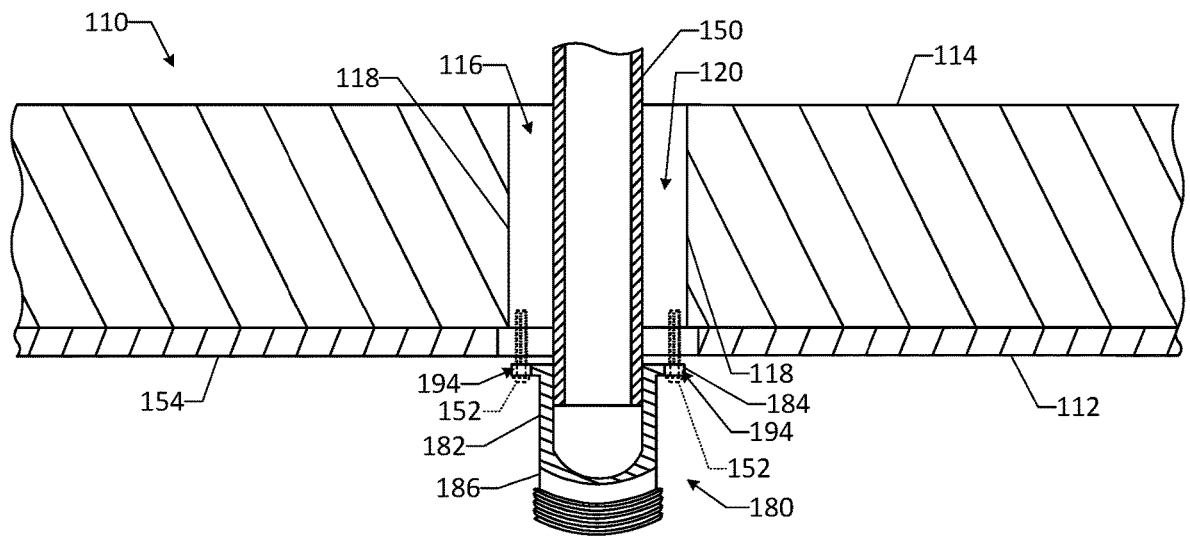
FIG. 2M is a cross-sectional top view of the exterior faucet and the exterior wall of FIG. 2L, taken along line 2M-2M.
Figure 2N:
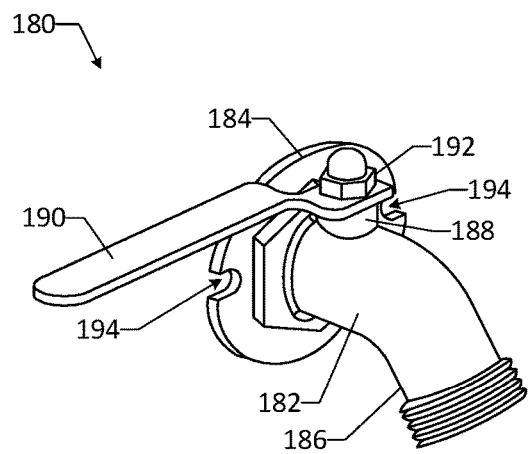
FIG. 2N is a detailed perspective view of the exterior faucet of FIG. 2L.

FIGS. 2L and 2M illustrate another example of the scenario described above in which it is not possible to mount another type of exterior faucet 180 (which also may be referred to herein as a "spigot") to the exterior wall 110 using conventional fasteners 152 (illustrated via dashed lines), such as screws, provided with the faucet 180 upon original manufacture. As shown, the exterior wall 110 may have a number of siding panels 154 mounted along the exterior surface 112 thereof, and the hole 116 in the exterior wall 110 may extend through one or more of the siding panels 154. In certain embodiments, the hole 116 may have an irregular shape through the one or more siding panels 154. As shown in detail in FIG. 2N, the exterior faucet 180 may be an assembly of a number of components attached to one another and configured to control water flow therethough. Although the exterior faucet 180 is illustrated as a spigot, other types of faucets may be used. As shown, the exterior faucet 180 may include a main body 182, a flange 184, a neck 186, a stem 188, a lever 190, and a lever nut 192. The flange 184 may be positioned at a first end of the main body 182 and extend radially outward therefrom. The flange 184 may have a generally circular shape, although other shapes of the flange 184 may be used. As shown, the flange 184 may include two or more mounting apertures 194 defined therein and configured to receive respective fasteners therethrough. In certain embodiments, as shown, the mounting apertures 194 may be formed as a pair of notches or slots defined along the outer circumference of the flange 184 on opposite sides of the main body 182. Other shapes of the mounting apertures 194 may be used, such as thru holes spaced apart from the outer circumference of the flange 184. The neck 186 may be positioned at or near an opposite second end of the main body 182 and extend downward therefrom. A free end portion of the neck 186 may be threaded, as shown, to facilitate attachment of a hose or other threaded member thereto. The stem 188 may extend through a packing nut and into the main body 182. In this manner, the stem 188 may actuate one or more internal components to control water flow through the exterior faucet 180. It will be appreciated that the exterior faucet 180 may include various internal components, such as a gland packing and a seat packing, configured to control water flow through the faucet 180. The lever 190 may be attached to the stem 188 by the lever nut 192 and configured to rotate with the stem 188 to move the exterior faucet 180 between a closed configuration (i.e., preventing water flow through the faucet 180) and an open configuration (i.e., allowing water flow through the faucet 180). As shown in FIGS. 2L and 2M, if the conventional fasteners 152 are positioned within the mounting apertures 194 of the exterior faucet 180 in a conventional manner, the fasteners 152 may extend into the gap 120 between the plumbing pipe 150 and the internal surfaces 118 defining the hole 116, without engaging the exterior wall 110. For this reason, the fasteners 152 may not be used when the exterior faucet 180 is installed. Accordingly, the exterior faucet 180 may be supported by only the plumbing pipe 150 and not mounted to the exterior wall 110.

Figure 2O:
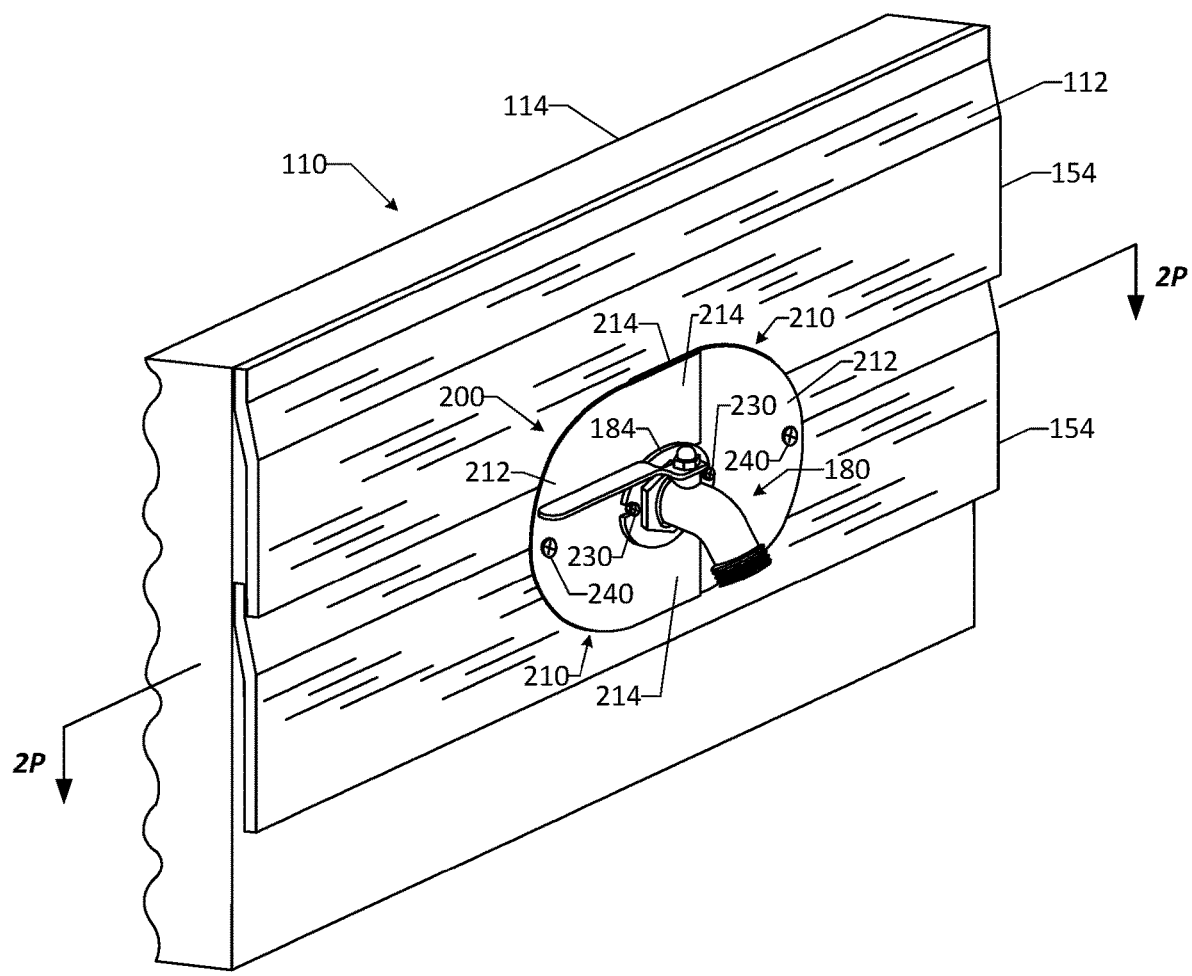
FIG. 2O is a perspective view of the exterior faucet mounted to the exterior wall of FIG. 2L via the mounting device of FIG. 2A.
Figure 2P:
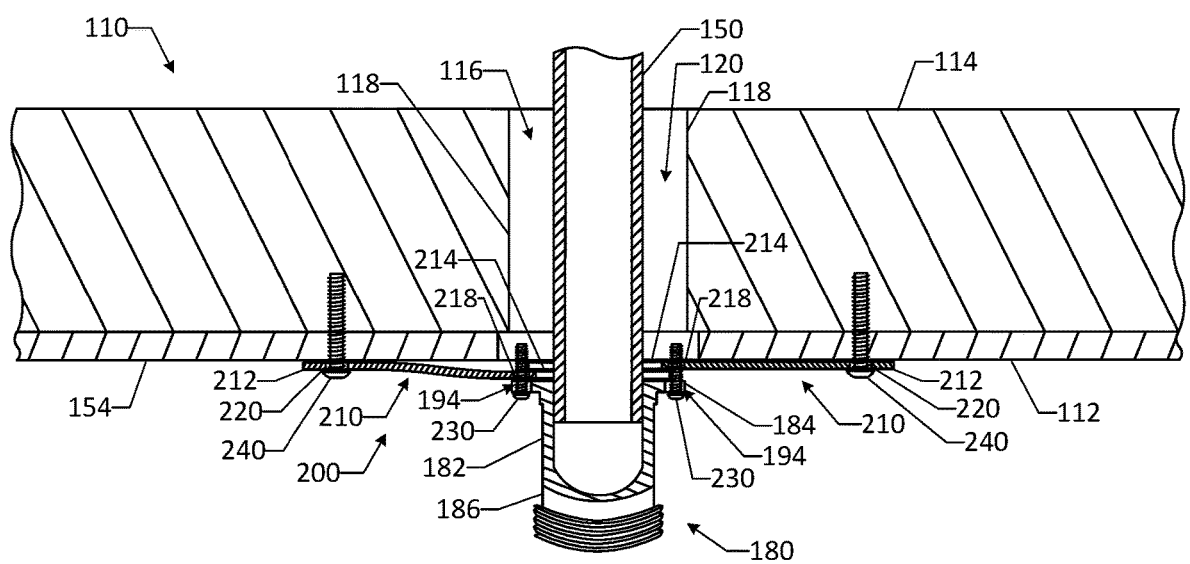
FIG. 2P is a cross-sectional top view of the exterior faucet, the exterior wall, and the mounting device of FIG. 2O, taken along line 2P-2P.

FIGS. 2O and 2P illustrate the mounting device 200 being used to mount the exterior faucet 180 to the exterior wall 110, according to one or more embodiments of the disclosure. The mounting device 200 may be installed by initially positioning one of the plates 210 (which may be referred to herein as a "first plate") between the exterior wall 110 and the flange 184 of the exterior faucet 180, such that the plumbing pipe 150 is at least partially received within the slot 216 of the first plate 210. In particular, the first plate 210 may be slid into position, from either the right side or the left side of the exterior faucet 180, until the plumbing pipe 150 is received within the slot 216, while the longitudinal axis $A_L$ of the first plate 210 is maintained in a horizontal or substantially horizontal orientation, as shown. In a similar manner, the other plate 210 (which may be referred to herein as a "second plate") then may be positioned between the exterior wall 110 and the flange 184 of the exterior faucet 180, such that the plumbing pipe 150 is at least partially received within the slot 216 of the second plate 210. In particular, the second plate 210 may be slid into position, from either the right side or the left side of the exterior faucet 180 (i.e., the side opposite that from which the first plate 210 was inserted), until the plumbing pipe 150 is received within the slot 216, while the longitudinal axis $A_L$ of the second plate 210 is maintained in a horizontal or substantially horizontal orientation, as shown. With the plates 210 positioned in this manner, the first plate 210 and the second plate 210 may at least partially overlap one another. In particular, the respective arms 214 of the plates 210 may at least partially overlap one another, as shown. In certain embodiments, the respective arms 214 of each plate 210 also may partially overlap a portion of the base 212 of the other plate 210. The degree of overlap of the plates 210 may be adjusted (i.e., the plates 210 may be translated with respect to one another in the direction of the longitudinal axes $A_L$ thereof) until the respective first holes 218 of the plates 210 are aligned with the mounting apertures 194 of the flange 184 of the exterior faucet 180.

With the respective first holes 218 of the plates 210 aligned with the mounting apertures 194 of the flange 184, the first fasteners 230 then may be inserted through the mounting apertures 194 and into the first holes 218. In particular, one of the first fasteners 230 may be inserted through one of the mounting apertures 194 and into the first hole 218 of the first plate 210, and the other of the first fasteners 230 may be inserted through the other of the mounting apertures 194 and into the first hole 218 of the second plate 210. As described above, the first holes 218 may be threaded such that the first fasteners 230 threadably engage the respective first holes 218. Alternatively, the first fasteners 230 may be inserted into the respective first holes 218 of the plates 210 prior to positioning of the plates 210 with respect to the exterior faucet 180 as described above, with the heads of the first fasteners 230 spaced apart from the respective plates 210. In this manner, the first fasteners 230 may be slid into the respective mounting apertures 194 as the plates 210 are slid between the exterior wall 110 and the flange 184. Either way, once the first fasteners 230 are positioned within the respective first holes 218 and within the respective mounting holes 194, the first fasteners 230 may be tightened by threadably advancing the first fasteners 230 through the plates 210 until the heads of the first fasteners 230 engage the flange 184 adjacent the respective mounting apertures 194. In this manner, the plates 210 of the mounting device 200 may be securely attached to the exterior faucet 180.

After attaching the plates 210 to the flange 184 of the exterior faucet 180, the plates 210 may be attached to the exterior wall 110 by inserting the second fasteners 240 through the respective second holes 220. In particular, one of the second fasteners 240 may be inserted through the second hole 220 of the first plate 210 and into the exterior wall 110, and the other of the second fasteners 240 may be inserted through the second hole 220 of the second plate 210 and into the exterior wall 110. As described above, the second fasteners 240 may be masonry screws, although other types of suitable fasteners may be used. In certain embodiments, respective holes may be drilled or tapped in the exterior wall 110 through the second holes 220 of the plates 210 prior to inserting the second fasteners 240 into the exterior wall 110. In other embodiments, the second fasteners 240 may be self-tapping, such that prior drilling in the exterior wall 110 is not required. Either way, once the second fasteners 240 are inserted through the respective second holes 220 and into the exterior wall 110, the second fasteners 240 may be tightened by advancing the second fasteners 240 through the plates 210 until the heads of the second fasteners 240 engage the plates 210 adjacent the respective second holes 220. In this manner, the plates 210 of the mounting device 200 may be securely attached to the exterior wall 110. In certain embodiments, as the second fasteners 240 are tightened, a portion of one or both of the plates 210 may deform slightly to conform to the shape or contour of mating portions of the exterior wall 110, the other plate 210, and/or the exterior faucet 180. For example, a portion of the outer plate 210 (i.e., the plate 210 having its arms 214 positioned adjacent the flange 184 of the exterior faucet 180) may deform slightly, as shown, to conform to the shape of the exterior wall 110 and the inner plate 210 (i.e., the plate 210 having its arms 214 positioned adjacent the exterior wall 110). In this manner, the deformation of the plates 210 may facilitate sealing of the gap 120 and the interface between the exterior wall 110 and the exterior faucet 180, as the plates 210 conform to the exterior wall 110 and accommodate irregularities in the exterior surface 112 thereof.

With the mounting device 200 installed in the above-described manner, the exterior faucet 180 may be securely mounted to the exterior wall 110 via the plates 210, the first fasteners 230, and the second fasteners 240. Moreover, the mounting device 200 may adequately seal the gap 120 between the plumbing pipe 150 and the internal surfaces 118 of the exterior wall 110 as well as the interface between the exterior faucet 180 and the exterior wall 110. In this manner, the mounting device 200 may be used to address the problems associated with the exterior faucet 180 being improperly installed with respect to the exterior wall 110. It will be appreciated that the adjustable nature of the mounting device 200 may accommodate plumbing pipes 150 and exterior faucets 180 of different sizes and shapes. In this manner, the mounting device 200 may be easily used in existing-construction applications, although the device similarly may be used in new-construction applications. The configuration of the mounting device 200 allows it to be installed in a quick and efficient manner, with minimal tools required, and without requiring removal of the exterior faucet 180 from the plumbing pipe 150 or turning off the water supply to the faucet 180. Further, the mounting device 200 may be easily removed, if desired, for example to access or inspect the plumbing pipe 150.

Figure 2Q:
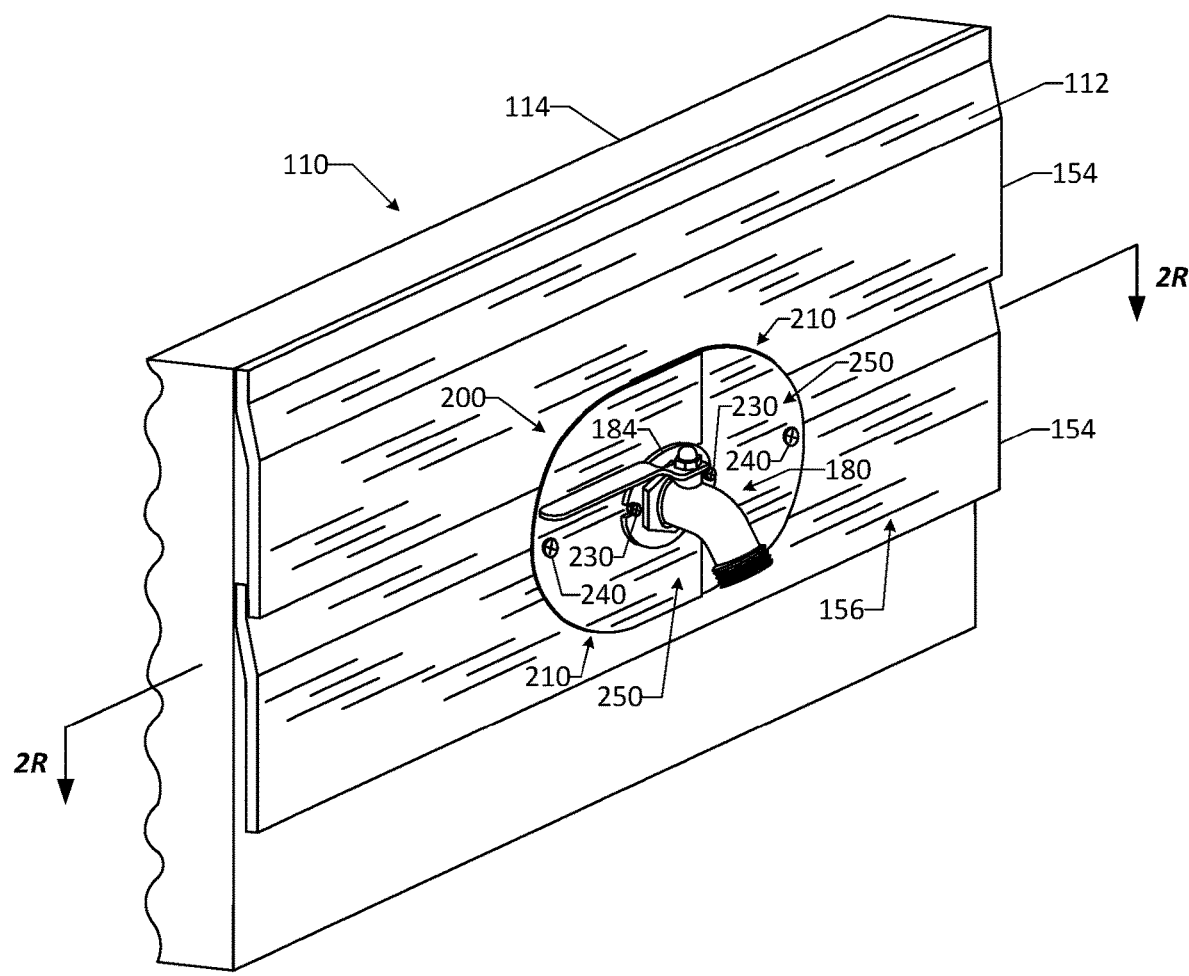
FIG. 2Q is a perspective view of the exterior faucet mounted to the exterior wall of FIG. 2L via the mounting device of FIG. 2A and a pair of cover plates.
Figure 2R:
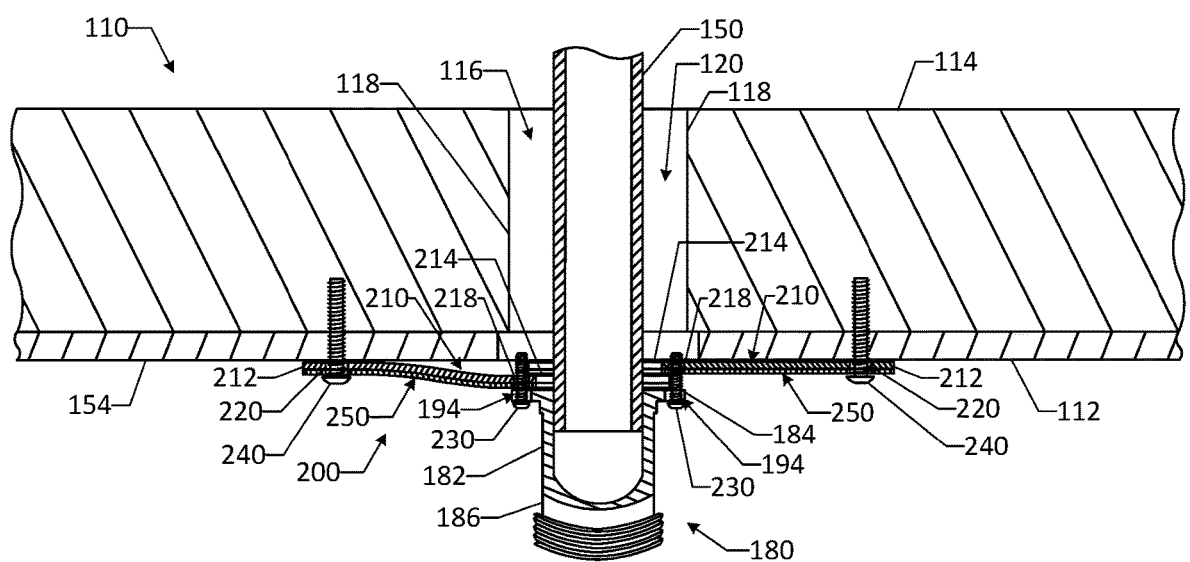
FIG. 2R is a cross-sectional top view of the exterior faucet, the exterior wall, the mounting device, and the cover plates of FIG. 2Q, taken along line 2R-2R.

FIGS. 2Q and 2R illustrate the mounting device 200 and a pair of cover plates 250 being used to mount the exterior faucet 180 to the exterior wall 110, according to one or more embodiments of the disclosure. In certain embodiments, as shown, the siding panels 154 of the exterior wall 110 may include one or more texture patterns 156 formed along the exterior surface 112 of the wall 110. Further, the siding panels 154 may have a particular color. In certain applications, it may be desirable to cover at least a portion of the mounting device 200, such that the device 200 does not provide a sharp visual contrast with respect to the color and texture pattern of the exterior wall 110 or the siding panels 154 thereof. In such applications, the cover plates 250 may be used. As shown, the cover plates 250 each may formed in a manner similar to the plates 210, having a U-shape with a base and a pair of arms. Each cover plate 250 also may include a first hole corresponding to the first hole 218 of the plate 210 and a second hole corresponding to the second hole 220 of the plate 210, although both the first hole and the second hole of the cover plate 250 may be unthreaded. In this manner, the first fasteners 230 and the second fasteners 240 may pass through the respective holes of the cover plate 250. The cover plates 250 may have a color and a texture pattern that matches the color and the texture pattern 156 of the exterior wall 110 or the siding panels 154 thereof. In certain embodiments, the cover plates 250 may be formed of the same material as the exterior wall 110 or the siding panels 154 thereof. During use, the cover plates 250 may be positioned over the plates 210 of the mounting device 200, such that the cover plates 250 cover the plates 210 from view and the device 200 blends in with the exterior wall 110. In certain embodiments, the cover plates 250 may be attached to the respective plates 210, such as by an adhesive or other fastening means, prior to positioning the plates 210 with respect to the exterior faucet 180. In other embodiments, the plates 250 may not be directly attached to the plates 210 but may be simply positioned over the plates 210 and positioned along with the plates 210 relative to the exterior faucet 180 during installation of the mounting device 200. In certain embodiments, the cover plates 250 may be omitted, and the plates 210 may have a coating applied along the exterior surface thereof. The coating may have a color and a texture pattern that matches the color and the texture pattern 156 of the exterior wall 110 or the siding panels 154 thereof. In this manner, the plates 210 may provide the same function as the cover plates 250 by allowing the device 200 to blend in with the exterior wall 110, without the need for additional components.

Figure 3A:
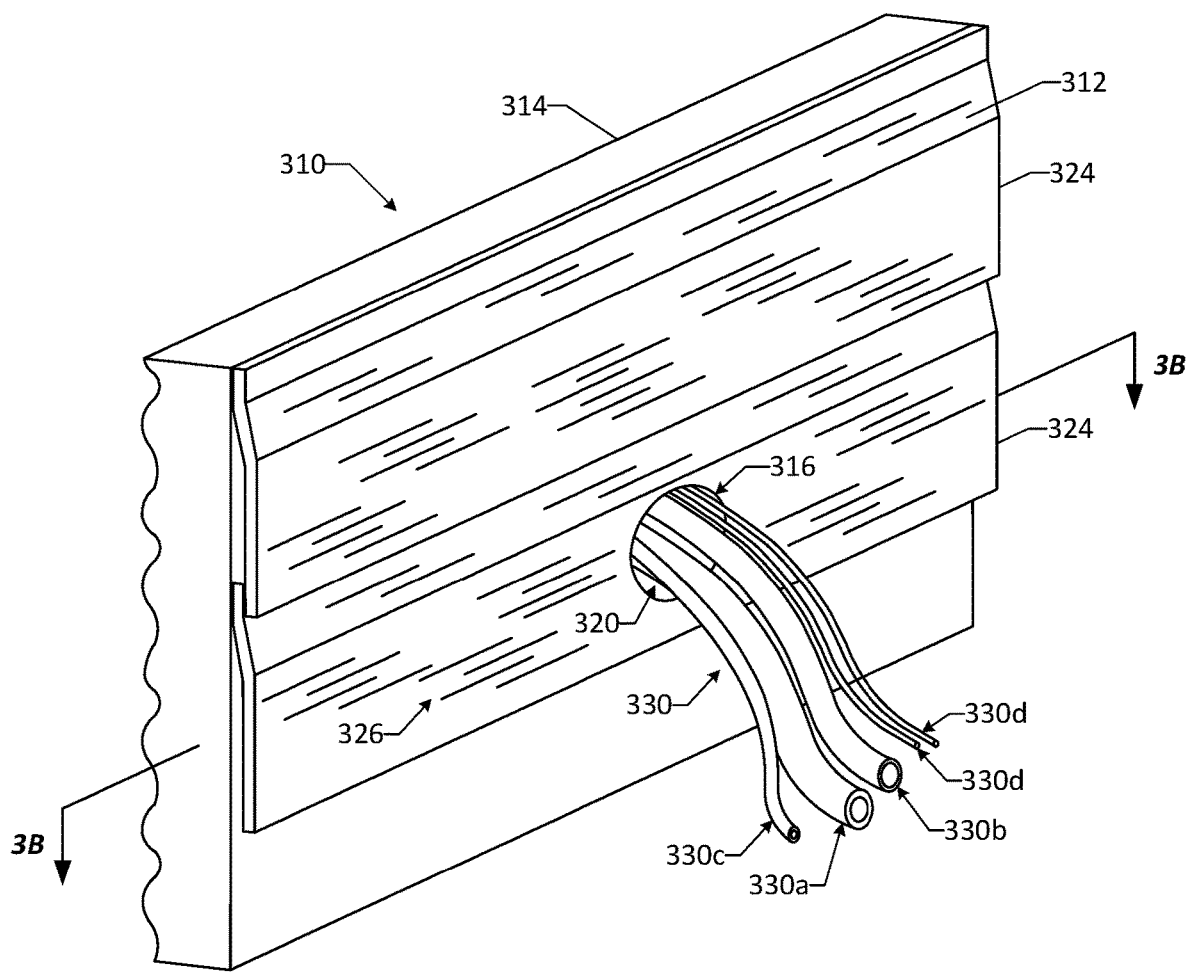
FIG. 3A is a perspective view of a number of exterior lines positioned along an exterior wall of a building.
Figure 3B:
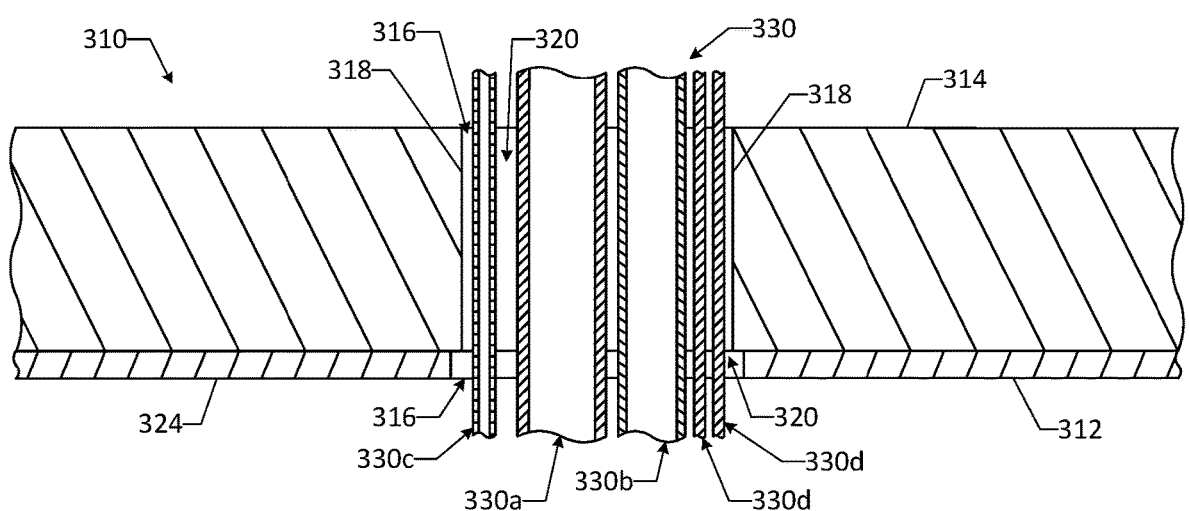
FIG. 3B is a cross-sectional top view of the exterior lines and the exterior wall of FIG. 3A, taken along line 3B-3B.

FIGS. 3A and 3B illustrate an exterior wall 310 of a building and a number of exterior lines 330 each having portions extending through and positioned along the exterior wall 310. The exterior wall 310 may be formed of various materials, such as a masonry material, although other materials may be used. The exterior wall 310 may have an exterior surface 312 along an exterior side thereof and an interior surface 314 along an interior side thereof. The exterior wall 310 may be part of an existing structure, with the exterior lines 330 already extending through the exterior wall 310 and attached to respective system components positioned outside of the building (i.e., outward from the exterior surface 312 of the wall 310) and inside of the building (i.e., inward from the interior surface 314 of the wall 310). In particular, the exterior lines 330 may extend at least partially through a hole 316 (which also may be referred to herein as a "penetration") defined in the exterior wall 310. In certain embodiments, as shown, the hole 316 may extend from the exterior surface 312 to the interior surface 314 of the exterior wall 310, although other configurations of the hole 316 may be used. In this manner, the hole 316 may be defined by internal surfaces 318 of the exterior wall 310. As described above, the hole 316 may have been formed during initial construction of the exterior wall 310. As a result, the hole 316 may be significantly larger than the exterior lines 330, such that a gap 320 is defined between the exterior lines 330 and the internal surfaces 318 defining the hole 316. Although a number of the exterior lines 330 are shown in the illustrated embodiment, in other embodiments, only a single exterior line 330 may extend through the hole 316. In certain embodiments, as shown, the exterior wall 310 may have a number of siding panels 324 mounted along the exterior surface 312 thereof, and the hole 316 in the exterior wall 310 may extend through one or more of the siding panels 324. In certain embodiments, the hole 316 may have a regular shape, such as a circular shape, through the one or more siding panels 324. In other embodiments, the hole 316 may have an irregular shape, for example due to modifications over time to accommodate additional exterior lines 330.

The exterior lines 330 may include various types of lines for various types of systems associated with the building. As used herein, the term "exterior line" refers to any type of elongated member that extends through an exterior wall of a building and includes a portion positioned outside of the building (i.e., outward from an exterior surface of the exterior wall). Certain exterior lines may be at least partially flexible and/or deformable, while other exterior lines may be rigid or substantially rigid. Exterior lines may be formed as conduits, tubes, or pipes configured to allow a liquid, gas, solid, or semi-solid material to pass therethrough, or may be formed as solid members, such as coated wires, configured to allow electrical current to pass therethrough. For example, the number of exterior lines 330 may include an air-conditioning (AC) line 330a, a condensation line 330b, a gas line 330c, and a pair of electrical lines 330d, although other configurations of the exterior lines 330 may be used. The respective exterior lines 330 may be in fluid communication, electrical communication, or other operable communication with respective HVAC systems, gas systems, electrical systems, and/or other systems associated with the building. It will be appreciated that that the various lines 330 may have different sizes as well as different degrees of flexibility or rigidity and may be formed of different materials.

FIGS. 3A and 3B illustrate an example of the scenario described above in which the exterior lines 330 are unsupported within the hole 316 and able to move with respect to the exterior wall 310. Accordingly, the exterior lines 330 may rest on one or more of the internal surfaces 318 defining the hole 316 and may otherwise be supported only by the connections to their respective systems. As explained above, the lack of attachment of the exterior lines 330 to the exterior wall 310 may present several problems, including allowing the lines 330 to move with respect to the wall 310. In particular, the exterior lines 330 may be able to move vertically, horizontally, and/or axially with respect to the exterior wall 310. Additionally, the lack of attachment of the exterior lines 330 to the exterior wall 310 may allow the gap 320 to be exposed along the exterior surface 312 of the wall 310, as shown, due to the positioning of the exposed portions of the lines 330 relative to the exterior surface 312 of the wall 310.

FIGS. 4A-4F illustrate a mounting device 400 (which also may be referred to herein as a "stabilizing device," a "sealing device," or simply a "device") according to one or more embodiments of the disclosure. As described further below, the mounting device 400 may be configured for securing exterior lines with respect to an exterior wall of a building, such that the exterior lines are stabilized relative to the exterior wall and such that a gap between the exterior lines and internal surfaces of a hole in the external wall as well as an interface between the exterior lines and the exterior wall are sealed. In this manner, the mounting device 400 may be used to address the problems associated with the exterior lines 330 being unattached to the exterior wall 310.

Figure 4A:
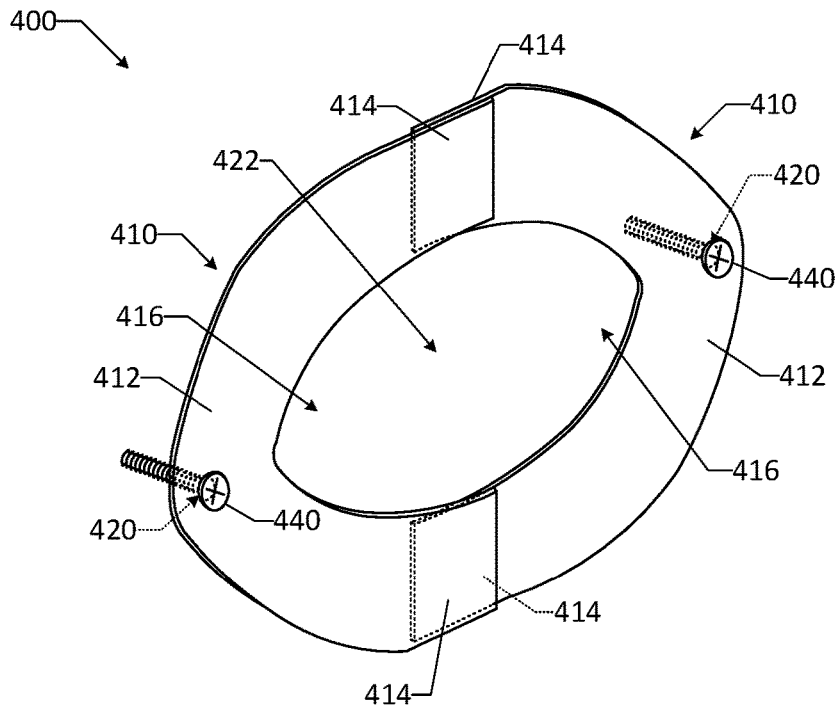
FIG. 4A is a perspective view of a mounting device in accordance with one or more embodiments of the disclosure, showing a pair of plates and a number of fasteners of the mounting device in an assembled configuration.
Figure 4B:
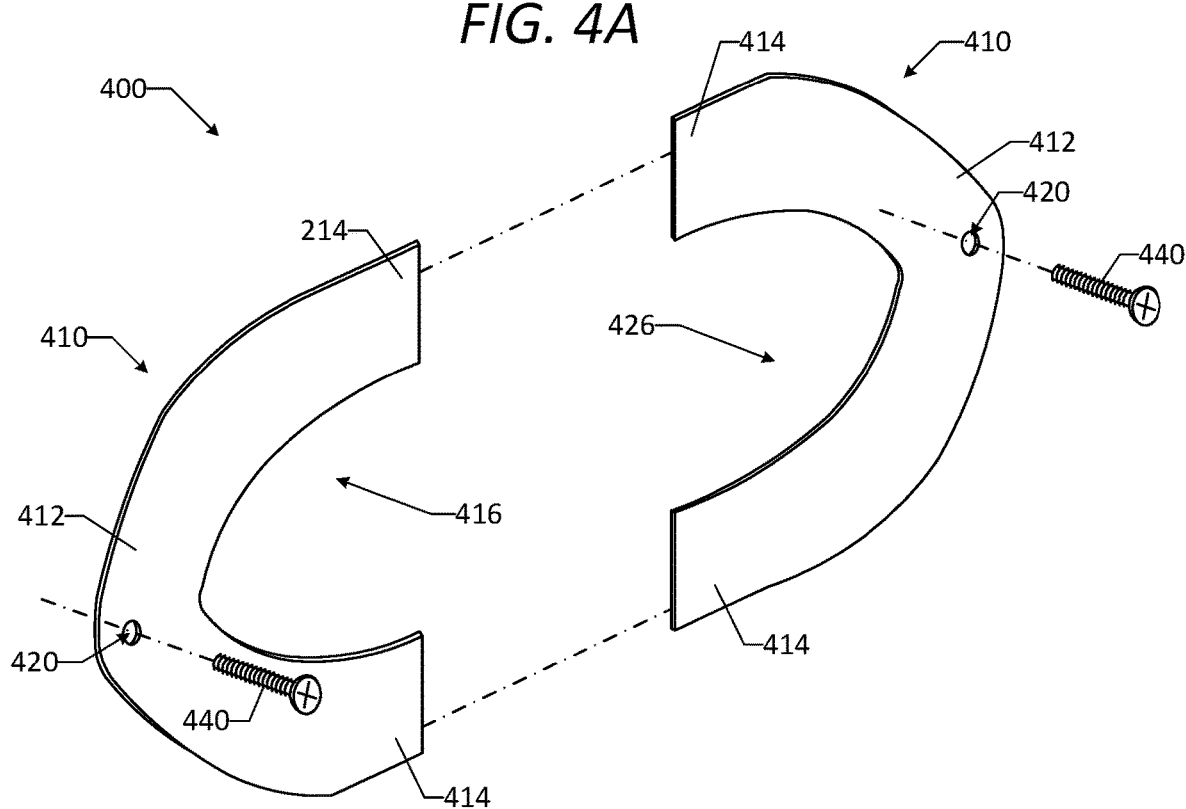
FIG. 4B is an exploded perspective view of the mounting device of FIG. 4A, showing the plates and the fasteners in a disassembled configuration.
Figure 4C:
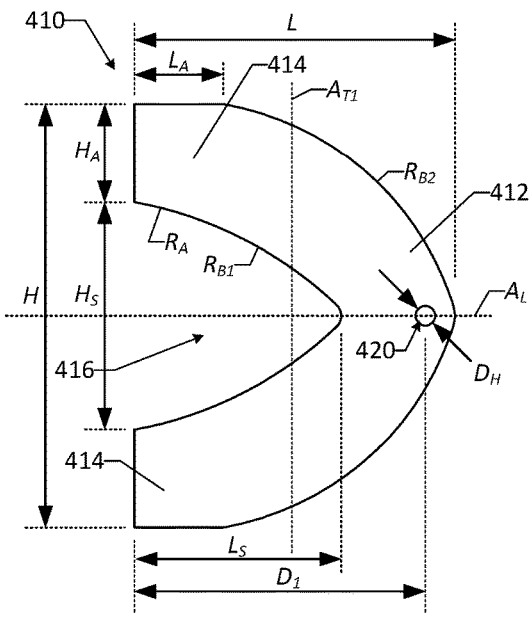
FIG. 4C is a front view of one of the plates of the mounting device of FIG. 4A.
Figure 4D:
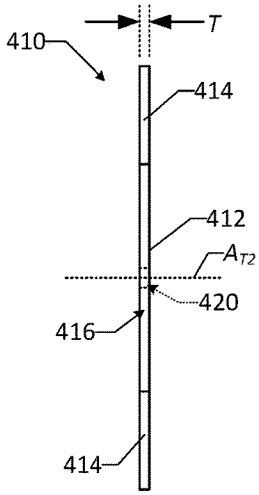
FIG. 4D is a side view of one of the plates of the mounting device of FIG. 4A.

As shown in FIGS. 4A and 4B, the mounting device 400 may include a pair of plates 410 (which also may be referred to herein as "mounting plates" of "U-plates") and a pair of fasteners 440 (which also may be referred to herein as "wall fasteners"). In certain embodiments, as shown, the plates 410 may have an identical configuration. In other embodiments, one of the plates 410 may have a different configuration than the other plate 410. Each plate 410 may be formed as a flat, planar member, as shown, having an overall length L in a direction of a longitudinal axis $A_L$ of the plate 410, an overall height H in a direction of a first transverse axis $A_{T1}$ of the plate 410, and an overall thickness T in a direction of a second transverse axis $A_{T2}$ of the plate 410. In certain embodiments, the overall length L may be within a range of between 2.0 inches and 5.0 inches, the overall height H may be within a range of between 3.0 inches and 6.0 inches, and the overall thickness T may be within a range of between 0.025 inches (24 gauge) and 0.0625 inches (16 gauge). In certain embodiments, the overall length L may be 3.0 inches, the overall height H may be 4.0 inches, and the overall thickness T may be 0.0375 inches (20 gauge). In certain embodiments, the plate 410 may be formed of a sheet metal, such as steel, although other suitable materials may be used.

As shown, each plate 410 may have a U-shape, with a base 412 and a pair of arms 414 extending from the base 412 in the direction of the longitudinal axis $A_L$ of the plate 410. The base 412 may form the curved portion of the U-shape, and the arms 414 may form the straight, or substantially straight, portions of the U-shape. As shown, a slot 416 may be defined between an internal edge of the base 412 and respective internal edges of the arms 414. As described below, the slot 416 may be configured to receive a portion of one or more exterior lines therein during use of the mounting device 400. The base 412 may have a first radius $R_{B1}$ of curvature along the internal edge thereof and a second radius $R_{B2}$ of curvature along the external edge thereof. In certain embodiments, the first radius $R_{B1}$ may be within a range of between 0.25 inches and 1.5 inches, and the second radius $R_{B2}$ may be within a range of between 1.5 inches and 3.0 inches. In certain embodiments, the first radius $R_{B1}$ may be 0.75 inches, and the second radius $R_{B2}$ may be 2.0 inches. Each arm 414 may have a radius $R_{A1}$ of curvature along the internal edge thereof. In certain embodiments, the radius $R_{A1}$ may be within a range of between 0.5 inches and 1.5 inches. In certain embodiments, the radius $R_{A1}$ may be 1.0 inches. Each arm 414 may have a length $L_A$ along the external edge thereof in the direction of the longitudinal axis $A_L$, and a height $H_A$ along the free end edge thereof in the direction of the first transverse axis $A_{T1}$. In certain embodiments, the length $L_A$ may be within a range of between 0.25 inches and 1.5 inches, and the height $H_A$ may be within a range of between 0.25 inches and 1.5 inches. In certain embodiments, the length $L_A$ may be 0.75 inches, and the height $H_A$ may be 1.0 inches. The slot 416 may have a length $L_S$ in the direction of the longitudinal axis $A_L$, and a height $H_S$ in the direction of the first transverse axis $A_{T1}$. In certain embodiments, the length $L_S$ may be within a range of between 1.0 inches and 2.5 inches, and the height $H_S$ may be within a range of between 1.25 inches and 2.75 inches. In certain embodiments, the length $L_S$ may be 1.75 inches, and the height $H_S$ may be 2.0 inches. As shown, the thickness T of the plate 410 may be constant along the base 412 and the arms 414 thereof. In other embodiments, the thickness T of the plate 410 may vary along the base 412 and/or the arms 414 or the thickness T of the plate 410 may different along the base 412 as compared to the arms 414.

Each plate 410 also may include a hole 420 extending through the plate 410 in the direction of second transverse axis $A_{T2}$. In particular, the hole 420 may be defined in the base 412 of the plate 410 and positioned along the longitudinal axis $A_L$ of the plate 410, as shown. The hole 420 may be positioned closer to the external edge of the base 412 than the internal edge of the base 412. In particular, the hole 420 may be positioned near but spaced apart from the external edge of the base 412. A center of the hole 420 may be spaced apart from the free end edges of the arms 414 by a first distance $D_1$ in the direction of the longitudinal axis $A_L$. In certain embodiments, the first distance $D_1$ may be within a range of between 2.0 inches and 4.0 inches. In certain embodiments, the first distance $D_1$ may be 2.75 inches. As shown, the hole 420 may be configured to receive one of the fasteners 440 therethrough. The fastener 440 may be a screw, and the hole 420 may be an unthreaded (i.e. smooth bore) thru hole configured to allow the fastener 440 to pass therethrough. In certain embodiments, the fastener 440 may be a masonry screw, although other types of fasteners suitable for attaching to an exterior wall may be used. In certain embodiments, the hole 420 may have a diameter $D_H$ within a range of between 0.15 inches and 0.3 inches. In certain embodiments the diameter $D_H$ of the hole 420 may be 0.202 inches.

Figure 4E:
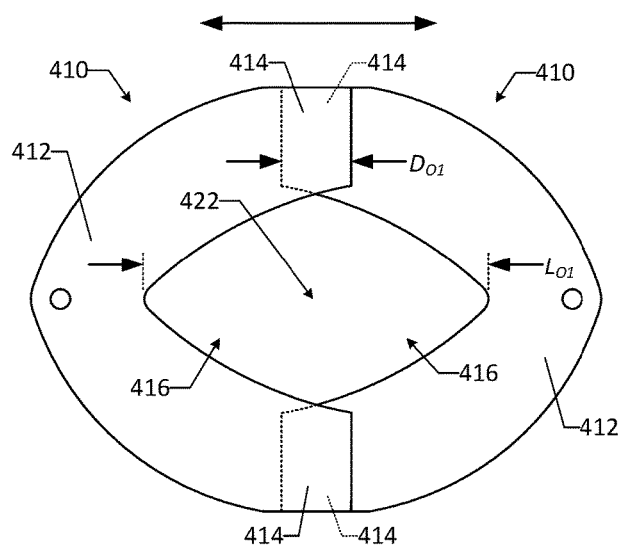
FIG. 4E is a front view of the plates of the mounting device of FIG. 4A in a first overlapping configuration.
Figure 4F:
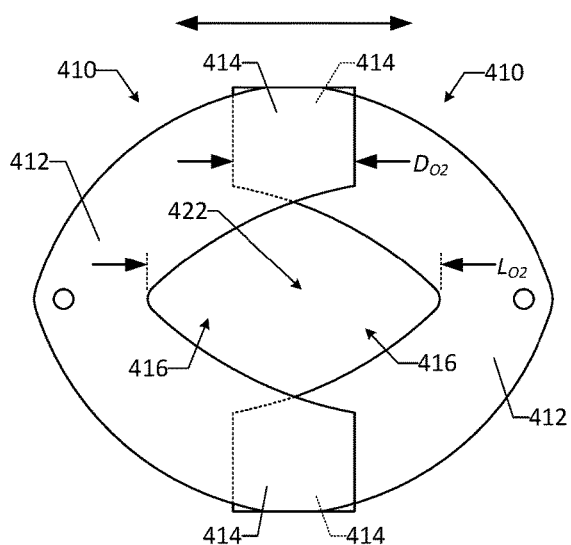
FIG. 4F is a front view of the plates of the mounting device of FIG. 4A in a second overlapping configuration.

During use of the mounting device 400, the plates 410 may be positioned to partially overlap one another, as shown in FIGS. 4E and 4F. In particular, the respective arms 414 of the plates 410 may at least partially overlap one another, while the respective external edges of the arms 414 are generally aligned with one another. In this manner, the slots 416 of the plates 410 may collectively define an opening 422 between the internal edges of the arms 414 and/or the internal edges of the bases 412. The size of the opening 422 may be adjusted by the degree of overlap of the respective arms 414 of the plates 410. For example, in a first configuration shown in FIG. 4E, the plates 410 may be positioned with a first overlap distance $D_{O1}$ of the arms 414 in the direction of the longitudinal axes $A_L$ of the plates 410, such that the opening 422 has a generally oval shape and a first length $L_{O1}$. The plates 410 may be translated relative to one another from the first configuration to a second configuration shown in FIG. 4F, in which the plates 410 may be positioned with a second overlap distance $D_{O2}$ of the arms 414 in the direction of the longitudinal axes $A_L$ of the plates 410, such that the opening 422 has a smaller generally oval shape and a second length $L_{O2}$. It will be appreciated that the plates 410 may be positioned in various configurations with different overlap distances to adjust the size of the opening 422, as desired, to accommodate respective portions of one or more exterior lines of different sizes and shapes.

Figure 4G:
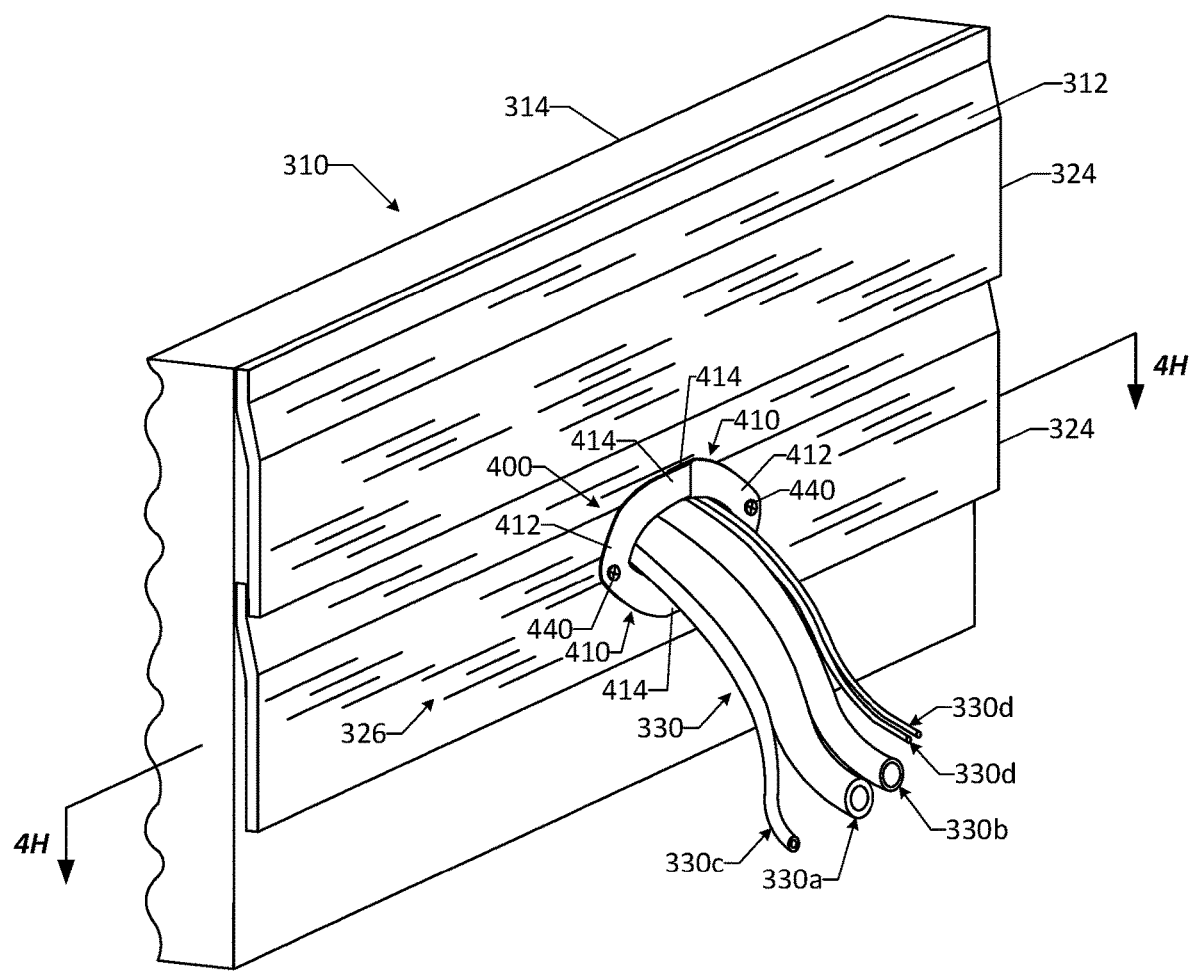
FIG. 4G is a perspective view of a number of exterior lines mounted to an exterior wall of a building via the mounting device of FIG. 4A.
Figure 4H:
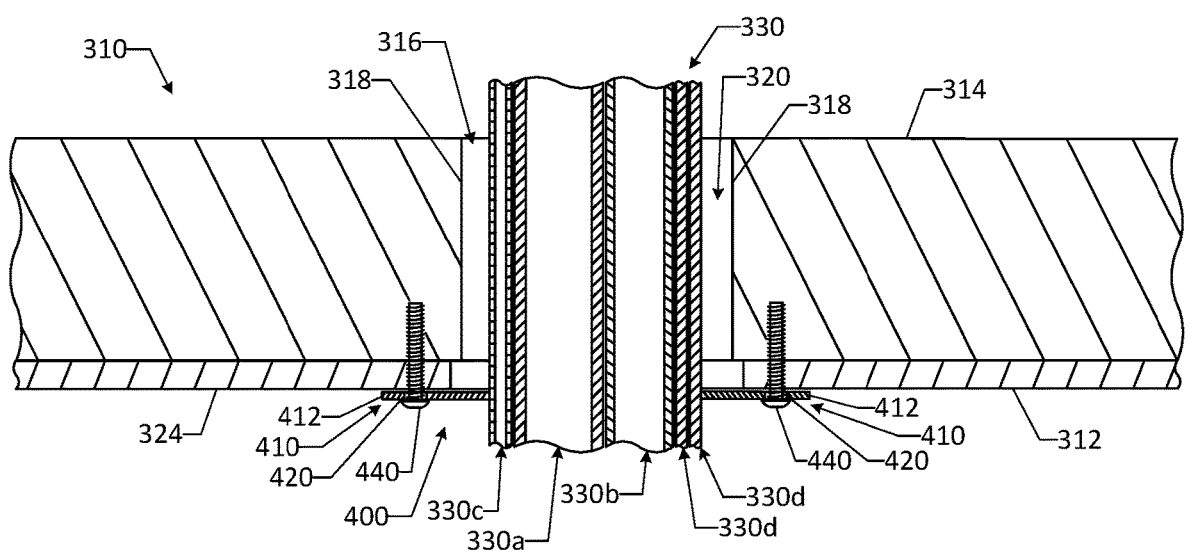
FIG. 4H is a cross-sectional top view of the exterior lines, the exterior wall, and the mounting device of FIG. 4G, taken along line 4H-4H.

FIGS. 4G and 4H illustrate the mounting device 400 being used to secure the exterior lines 330 to the exterior wall 310, according to one or more embodiments of the disclosure. The mounting device 400 may be installed by initially positioning one of the plates 410 (which may be referred to herein as a "first plate") against the exterior wall 310, such that portions of one or more of the exterior lines 330 are at least partially received within the slot 416 of the first plate 410. In particular, the first plate 410 may be slid into position, from either the right side or the left side of the exterior lines 330, until portions of one or more of the lines 330 are received within the slot 416, while the longitudinal axis $A_L$ of the first plate 410 is maintained in a horizontal or substantially horizontal orientation, as shown. In a similar manner, the other plate 410 (which may be referred to herein as a "second plate") then may be positioned against the exterior wall 310 and the first plate 410, such that portions of one or more of the exterior lines 330 are at least partially received within the slot 416 of the second plate 410. In particular, the second plate 410 may be slid into position, from either the right side or the left side of the exterior lines 330 (i.e., the side opposite that from which the first plate 410 was inserted), until portions of one or more of the lines 330 are received within the slot 416, while the longitudinal axis $A_L$ of the second plate 410 is maintained in a horizontal or substantially horizontal orientation, as shown. With the plates 410 positioned in this manner, the first plate 410 and the second plate 410 may at least partially overlap one another. In particular, the respective arms 414 of the plates 410 may at least partially overlap one another, as shown. In certain embodiments, the respective arms 414 of each plate 410 also may partially overlap a portion of the base 412 of the other plate 410. The degree of overlap of the plates 410 may be adjusted (i.e., the plates 410 may be translated with respect to one another in the direction of the longitudinal axes $A_L$ thereof) until the opening 422 formed between the plates 410 substantially matches a collective cross-sectional profile of the exterior lines 330. In other words, the degree of overlap of the plates 410 may be adjusted until the internal edges of the plates 410 contact the adjacent exterior lines 330, without undesirably compressing the lines 330 within the opening 422 of the mounting device 400.

With the opening 422 of the mounting device 400 substantially matching the collective cross-sectional profile of the exterior lines 330, the plates 410 may be attached to the exterior wall 310 by inserting the fasteners 440 through the respective holes 420. In particular, one of the fasteners 440 may be inserted through the hole 420 of the first plate 410 and into the exterior wall 310, and the other of the fasteners 440 may be inserted through the hole 420 of the second plate 410 and into the exterior wall 310. As described above, the fasteners 440 may be masonry screws, although other types of suitable fasteners may be used. In certain embodiments, respective holes may be drilled or tapped in the exterior wall 310 through the holes 420 of the plates 410 prior to inserting the fasteners 440 into the exterior wall 310. In other embodiments, the fasteners 440 may be self-tapping, such that prior drilling in the exterior wall 310 is not required. Either way, once the fasteners 440 are inserted through the respective holes 420 and into the exterior wall 310, the fasteners 440 may be tightened by advancing the fasteners 440 through the plates 410 until the heads of the second fasteners 440 engage the plates 410 adjacent the respective holes 420. In this manner, the plates 410 of the mounting device 400 may be securely attached to the exterior wall 310. In certain embodiments, as the fasteners 440 are tightened, a portion of one or both of the plates 410 may deform slightly to conform to the shape or contour of mating portions of the exterior wall 310 and/or the other plate 410. For example, a portion of the outer plate 410 (i.e., the plate 410 having its arms 414 positioned outward from the arms 414 of the other plate 410) may deform slightly, to conform to the shape of the exterior wall 310 and the inner plate 410 (i.e., the plate 410 having its arms 414 positioned adjacent the exterior wall 310 and inward from the arms 414 of the other plate 410). In this manner, the deformation of the plates 410 may facilitate sealing of the gap 320 and the interface between the exterior wall 310 and the exposed portions of the exterior lines 330, as the plates 410 conform to the exterior wall 310 and accommodate irregularities in the exterior surface 312 thereof.

With the mounting device 400 installed in the above-described manner, the exterior lines 330 may be securely mounted with respect to the exterior wall 310 via the plates 410 and the fasteners 440. Moreover, the mounting device 400 may adequately seal the gap 320 between the exterior lines 330 and the internal surfaces 318 of the exterior wall 310 as well as the interface between the exposed portions of the exterior lines 330 and the exterior wall 310. In this manner, the mounting device 400 may be used to address the problems associated with the exterior lines 330 not being attached to the exterior wall 310. It will be appreciated that the adjustable nature of the mounting device 400 may accommodate various combinations of multiple exterior lines 330 of different sizes and shapes. In this manner, the mounting device 400 may be easily used in existing-construction applications, although the device similarly may be used in new-construction applications. The configuration of the mounting device 400 allows it to be installed in a quick and efficient manner, with minimal tools required, and without having to disconnect the exterior lines 330 or turn off the systems associated with the exterior lines 330. Further, the mounting device 400 may be easily removed, if desired, for example to access or inspect the portions of the exterior lines 330 positioned within the hole 316 of the exterior wall 310.

In certain embodiments, as shown, the siding panels 324 of the exterior wall 310 may include one or more texture patterns 326 formed along the exterior surface 312 of the wall 310. Further, the siding panels 324 may have a particular color. In certain applications, it may be desirable to cover at least a portion of the mounting device 400, such that the device 400 does not provide a sharp visual contrast with respect to the color and texture pattern of the exterior wall 310 or the siding panels 324 thereof. In such applications, cover plates may be used with the plates 410 in a manner similar to the cover plates 250 described above with respect to FIGS. 2Q and 2R. Alternatively, in certain embodiments, the cover plates may be omitted, and the plates 410 may have a coating applied along the exterior surface thereof. The coating may have a color and a texture pattern that matches the color and the texture pattern 326 of the exterior wall 310 or the siding panels 324 thereof. In this manner, the plates 410 may provide the same function as the cover plates by allowing the device 400 to blend in with the exterior wall 310, without the need for additional components.

Many modifications of the embodiments of the present disclosure will come to mind to one skilled in the art to which the disclosure pertains upon having the benefit of the teachings presented herein through the foregoing descriptions and the associated drawings. Therefore, it is to be understood that the present invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mounting device for securing an exterior faucet to an exterior wall of a building, the mounting device comprising:
  a pair of mounting plates, each of the mounting plates comprising:
    a base;
    a pair of arms extending from the base and spaced apart from one another;
    a slot defined between the arms;
    a first hole extending through the mounting plate; and
    a second hole extending through the mounting plate;
  a pair of first fasteners configured to pass through the first holes of the pair of mounting plates;
  a pair of second fasteners configured to pass through the second holes of the pair of mounting plates; and a pair of cover plates configured to be positioned over the pair of mounting plates, each of the cover plates comprising:
a base;
a pair of arms extending from the base and spaced apart from one another; and
a slot defined between the arms;
a first hole extending through the cover plate; and
a second hole extending through the cover plate, wherein each of the cover plates has a color and a texture pattern corresponding to a color and a texture pattern of the exterior wall.

2. The mounting device of claim 1, wherein each of the mounting plates is formed as a planar member having a U-shape defined by the base and the arms of the mounting plate, wherein the base is curved, wherein the arms extend parallel to one another, wherein each of the mounting plates is formed of sheet metal, and wherein each of the mounting plates has an overall thickness that is constant along the base and the arms of the mounting plate.

3. The mounting device of claim 1, wherein the slot of each of the plates is defined by internal edges of the arms and an internal edge of the base, wherein the internal edges of the arms are straight, wherein the internal edge of the base is curved, wherein each of the mounting plates is configured to be positioned between the exterior wall and a flange of the exterior faucet, and wherein the slot of each of the mounting plates is configured to receive a portion of a plumbing pipe or the exterior faucet therein.

4. The mounting device of claim 1, wherein the first hole of each of the plates is threaded, and wherein the second hole of each of the plates is unthreaded.

5. The mounting device of claim 4, wherein each of the first fasteners is configured to threadably engage the first holes of the pair of mounting plates, wherein each of the first fasteners is a machine screw, and wherein each of the second fasteners is a masonry screw.

6. A method for securing an exterior faucet to an exterior wall of a building using a mounting device, the method comprising:
positioning a pair of mounting plates of the mounting device between the exterior wall and a flange of the exterior faucet, each of the mounting plates comprising:
a base;
a pair of arms extending from the base and spaced apart from one another;
a slot defined between the arms;
a first hole extending through the plate; and
a second hole extending through the plate;
inserting a pair of first fasteners of the mounting device through the respective first holes of the mounting plates;
inserting a pair of second fasteners of the mounting device through the respective second holes of the mounting plates; and
a pair of cover plates between the mounting plates and the flange of the exterior faucet, each of the cover plates comprising:
a base;
a pair of arms extending from the base and spaced apart from one another; and
a slot defined between the arms;
a first hole extending through the cover plate; and
a second hole extending through the cover plate;
wherein each of the cover plates has a color and a texture pattern corresponding to a color and a texture pattern of the exterior wall.

7. The method of claim 6, wherein positioning the plates between the exterior wall and the flange of the exterior faucet comprises:
receiving a portion of a plumbing pipe or the exterior faucet within an opening defined by the respective slots of the plates;
positioning the plates such that the respective arms of the plates at least partially overlap one another; and
positioning the plates such that the respective first holes of the plates are aligned with a pair of mounting apertures of the flange of the exterior faucet.

8. The method of claim 6, wherein inserting the first fasteners through the respective first holes of the plates comprises:
inserting the first fasteners through each of a respective mounting aperture of the flange of the exterior faucet; and
threadably engaging the respective first holes of the plates with the first fasteners;
wherein inserting the second fasteners through the respective second holes of the plates comprises inserting the second fasteners into the exterior wall; and
wherein the second fasteners are inserted through the respective second holes of the plates after inserting the first fasteners through the respective first holes of the plates.

9. The method of claim 6, wherein the exterior faucet is a hose bib, a sillcock, or a spigot.

10. A mounting device for securing one or more exterior lines with respect to an exterior wall of a building, the mounting device comprising:
a pair of mounting plates, each of the mounting plates comprising:
a base;
a pair of arms extending from the base and spaced apart from one another;
a slot defined between the arms; and
a hole extending through the mounting plate; and
a pair of cover plates configured to be positioned over the mounting plates, each of the cover plates comprising:
a base;
a pair of arms extending from the base and spaced apart from one another;
a slot defined between the arms; and
a hole extending through the cover plate;
wherein each of the cover plates has a color and a texture pattern corresponding to a color and a texture pattern of the exterior wall; and
a pair of fasteners configured to pass through the respective holes of the plates,
wherein each of the plates is formed as a planar member having a U-shape defined by the base and the arms of the plate, wherein the base is curved, wherein the arms extend parallel to one another, wherein each of the plates is formed of sheet metal, and wherein each of the plates has an overall thickness that is constant along the base and the arms of the plate.

11. The mounting device of claim 10, wherein the slot of each of the plates is defined by internal edges of the arms and an internal edge of the base, wherein the internal edges of the arms are curved, wherein the internal edge of the base is curved, and wherein the slot of each of the plates is configured to receive a portion of the exterior lines therein.

12. The mounting device of claim 10, wherein the hole of each of the plates is unthreaded, wherein each of the fasteners is a masonry screw, and wherein the hole of each of the plates is positioned along a longitudinal axis of the plate.

13. A method for securing one or more exterior lines with respect to an exterior wall of a building using the mounting device of claim 10, the method comprising:
   positioning the pair of mounting plates against the exterior wall; and
   inserting the pair of fasteners through the respective holes of the plates.

14. The method of claim 13, wherein positioning the mounting plates against the exterior wall comprises:
   receiving a portion of the exterior lines within an opening defined by the respective slots of the mounting plates;
   positioning the mounting plates such that the respective arms of the mounting plates at least partially overlap one another; and
   positioning the mounting plates such that the opening defined by the respective slots of the mounting plates corresponds to a collective cross-sectional profile of the exterior lines;
   wherein inserting the fasteners through the respective holes of the mounting plates comprises inserting the fasteners into the exterior wall; and
   wherein the fasteners are inserted through the respective holes of the mounting plates after positioning the mounting plates against the exterior wall.

15. The method of claim 13, wherein the one or more exterior lines comprises at least one of an air conditioning line, a condensation line, and an electrical line.

\* \* \* \* \*